(12) United States Patent
Pedreiro et al.

(10) Patent No.: US 10,267,651 B2
(45) Date of Patent: Apr. 23, 2019

(54) FLUID FLOW SENSING SYSTEMS AND METHODS OF USE

(71) Applicant: Nudge Systems, LLC, Menlo Park, CA (US)

(72) Inventors: Ana V. Pedreiro, Menlo Park, CA (US); Marcelo A. De Camargo, Katy, TX (US)

(73) Assignee: Nudge Systems, LLC, Menlo Park, CA (US)

( * ) Notice: Subject to any disclaimer, the term of this patent is extended or adjusted under 35 U.S.C. 154(b) by 63 days.

(21) Appl. No.: 15/389,207

(22) Filed: Dec. 22, 2016

(65) Prior Publication Data

US 2017/0184417 A1 Jun. 29, 2017

Related U.S. Application Data

(60) Provisional application No. 62/271,988, filed on Dec. 28, 2015.

(51) Int. Cl.
| | |
|---|---|
| *G01D 4/00* | (2006.01) |
| *G01F 1/075* | (2006.01) |
| *G01F 1/115* | (2006.01) |
| *G01F 15/06* | (2006.01) |
| *G01F 25/00* | (2006.01) |
| *G01F 15/075* | (2006.01) |

(52) U.S. Cl.
CPC .......... *G01D 4/002* (2013.01); *G01F 15/063* (2013.01); *G01F 1/075* (2013.01); *G01F 1/115* (2013.01); *G01F 15/0755* (2013.01); *G01F 25/0007* (2013.01); *Y02B 90/241* (2013.01); *Y04S 20/32* (2013.01)

(58) Field of Classification Search
CPC .............................. G01D 4/002; G01F 15/063
See application file for complete search history.

(56) References Cited

U.S. PATENT DOCUMENTS

| | | | |
|---|---|---|---|
| 4,085,287 A | 4/1978 | Kullmann et al. | |
| 4,315,251 A | 2/1982 | Robinson et al. | |
| 4,481,805 A * | 11/1984 | Dobesh | G01F 25/0015 73/1.17 |

(Continued)

OTHER PUBLICATIONS

"International Search Report" and "Written Opinion of the International Searching Authority," Patent Cooperation Treaty Application No. PCT/US2016/068442, dated Mar. 17, 2017, 31 pages.

(Continued)

*Primary Examiner* — Michael J Dalbo
(74) *Attorney, Agent, or Firm* — Carr & Ferrell LLP

(57) ABSTRACT

Water meter sensing systems and methods of use are provided herein. A system includes a sensor that mounts to a fluid meter, the sensor measuring analog or digital fluid flow measurements of the fluid meter, a communications interface that transmits and receives data, a microprocessor that is communicatively coupled with the fluid sensor and the communications interface, and a component enclosure that includes a power source that powers both the fluid sensor and a communications interface. The microprocessor infers a flow rate based on the analog or digital fluid flow measurements and generates fluid flow signals, the fluid flow signals being transmitted to a receiving system.

18 Claims, 37 Drawing Sheets

(56) References Cited

U.S. PATENT DOCUMENTS

| | | | |
|---|---|---|---|
| 4,803,632 A | 2/1989 | Frew et al. | |
| 4,804,957 A | 2/1989 | Selph et al. | |
| 5,187,989 A | 2/1993 | Bulteau | |
| 5,228,327 A * | 7/1993 | Bruck | G01F 1/8413 702/45 |
| 5,283,572 A | 2/1994 | McClelland et al. | |
| 5,767,790 A | 6/1998 | Jovellana | |
| 6,049,791 A | 4/2000 | Lerner | |
| 6,088,688 A | 7/2000 | Crooks et al. | |
| 6,163,602 A | 12/2000 | Hammond et al. | |
| 6,351,223 B1 | 2/2002 | DeWeerd et al. | |
| 6,366,217 B1 | 4/2002 | Cunningham et al. | |
| 6,559,766 B2 | 5/2003 | Mohri | |
| 6,900,738 B2 | 5/2005 | Crichlow | |
| 7,228,726 B2 | 6/2007 | Kates | |
| 7,330,796 B2 | 2/2008 | Addink et al. | |
| 7,377,184 B1 | 5/2008 | Schlachter | |
| 7,669,461 B2 | 3/2010 | Kates | |
| 8,602,369 B2 | 12/2013 | Rinaldi et al. | |
| 8,618,941 B2 | 12/2013 | Javey et al. | |
| 8,866,634 B2 | 10/2014 | Williamson et al. | |
| 8,907,810 B2 | 12/2014 | Belz et al. | |
| 2003/0145371 A1* | 8/2003 | Ghertner | E03D 1/00 4/427 |
| 2004/0255691 A1* | 12/2004 | Yamamoto | G01F 1/586 73/861.12 |
| 2006/0059977 A1 | 3/2006 | Kates | |
| 2006/0168611 A1* | 7/2006 | Fima | E03B 1/00 725/10 |
| 2006/0265168 A1* | 11/2006 | Patten | G01F 1/00 702/100 |
| 2007/0206521 A1* | 9/2007 | Osaje | G01D 4/004 370/315 |
| 2010/0289652 A1* | 11/2010 | Javey | H04Q 9/00 340/605 |
| 2011/0303311 A1 | 12/2011 | Klicpera | |
| 2013/0080081 A1* | 3/2013 | Dugger | G01F 1/667 702/48 |
| 2013/0116941 A1* | 5/2013 | Lie-Nielsen | G01F 15/063 702/46 |
| 2014/0183386 A1* | 7/2014 | Ravid | G06F 17/00 251/129.01 |
| 2014/0320125 A1 | 10/2014 | Leeb et al. | |
| 2014/0366612 A1* | 12/2014 | Horne | G01F 1/66 73/40.5 A |
| 2015/0204703 A1* | 7/2015 | Brockhaus | G01F 1/58 73/861.12 |
| 2016/0161310 A1* | 6/2016 | Leaders | G01F 1/663 702/48 |
| 2016/0335875 A1* | 11/2016 | Alcorn | G01F 1/34 |
| 2017/0111713 A1* | 4/2017 | Adler | H04Q 9/00 |
| 2018/0306616 A1* | 10/2018 | Gillette, II | B01D 43/00 |

OTHER PUBLICATIONS

Pohl, Heather, "Automated Water Meter Program," San Francisco Water Power Sewer, Citizens' Advisory Committee, Presentation, Mar. 19, 2013, 11 pages.

"Automated Water Meter Program," San Francisco Public Utilities Commission [online], Mar. 28, 2014, retrieved from the internet [retrieved Mar. 31, 2017] from <URL:http://sfwater.org/index.aspx?page=51>, 2 pages.

* cited by examiner

FLUID FLOW SENSING SYSTEMS AND METHODS OF USE

CROSS REFERENCE TO RELATED APPLICATIONS

The present application claims the priority benefit of U.S. Provisional Patent Application Ser. No. 62/271,988 filed on Dec. 28, 2015 and titled "Water Awareness and Metering System" the disclosure of which is hereby incorporated by reference.

FIELD OF THE PRESENT INVENTION

The present invention relates generally to fluid flow measuring and more specifically, but not by limitation, to fluid flow sensing systems that can be coupled with pre-existing fluid meters to measure fluid flow through the fluid meters (either directly or by inference) and provide valuable metrics and/or fluid control features to users. Other embodiments include fluid flow sensing systems that measure fluid flow in the absence of pre-existing fluid meters. These fluid flow sensing systems are simple and easy to install, requiring no tools and/or user expertise to install and operate.

SUMMARY

According to some embodiments, the present disclosure is directed to a fluid meter sensor system, comprising: (a) a sensor that mounts to a fluid meter, the sensor measuring analog or digital fluid flow measurements of the fluid meter; (b) a communications interface that transmits and receives data; (c) a microprocessor that is communicatively coupled with the fluid sensor and the communications interface; and (d) a component enclosure that comprises a power source that powers both the fluid sensor and a communications interface, wherein the microprocessor infers a flow rate based on the analog or digital fluid flow measurements and generates fluid flow signals, the fluid flow signals being transmitted to a receiving system.

According to some embodiments, the present disclosure is directed to a fluid meter sensor system, comprising: (a) a fluid sensor that senses water flow within a conduit; (b) a communications interface that transmits and receives data; (c) microprocessor coupled with the fluid sensor and the communications interface; and (d) a component enclosure that comprises a power source that powers both the fluid sensor and a communications interface, wherein the fluid sensor senses fluid flow through the fluid meter and transmits fluid flow signals to a receiving system.

According to some embodiments a method of dynamically auto-range the fluid flow signals to enable operation with weak, asymmetrical, and varying frequency of the fluid flow signals of the present disclosure comprising: (a) obtaining the fluid flow signals upon initiation of the fluid sensor and sensing of the fluid flow; (b) determining maximum and minimum amplitudes of the fluid flow signals; (c) determine when the maximum and minimum amplitudes of the fluid flow signals are above a predetermined value (d) selecting an initial detection threshold using the maximum and minimum amplitudes; (e) selecting optimized measurement parameters used to process the fluid flow signals using the initial detection threshold and (f) determine that a minimum number of cycles have been detected and that the minimum number of cycles have a regular timing.

According to some embodiments a method of the present disclosure comprises: (a) place the microprocessor into a sleep mode when no fluid flow is detected; awaken the microprocessor when the fluid sensor senses that the fluid flow signals meet or exceed a flow detection threshold; detect that the microprocessor has just been awoke from the sleep mode; detect a possible condition when it has awaken on a noisy signal and that no fluid flow signals have been sensed based on a comparison of the fluid flow signals to the noise level threshold; calculate a new noise level threshold that comprises the noise level threshold plus an offset value; determine that a the new offset value will not prevent future awakenings of the microprocessor.

According to some embodiments, the present disclosure is directed to a method of classifying fluid flow events by: (a) detecting a beginning of a fluid flow event; (b) detecting an end of the fluid flow event; (c) computing event parameters between the beginning and the end, the event parameters comprising volume, duration, and flow rate; (d) comparing the event parameters to event ranges, each of the event ranges comprising event parameters values and having an event type; and (e) assigning the fluid flow event at least one event type based on the comparison.

In some embodiments, the systems of the present disclosure can be manually calibrated using a calibration container method. In yet other embodiments, the systems of the present disclosure can be calibrated using a self-calibration methodology that uses water flow event characteristics, calculates calibration factors, and performs accuracy augmentation.

The systems and methods provided herein can also be claimed in terms of means-plus-function and/or step-for-function arrangements. Also, methods can be encoded on computer readable media that can be executed by a processor to perform the method.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION OF EXEMPLARY EMBODIMENTS

Figure 1:
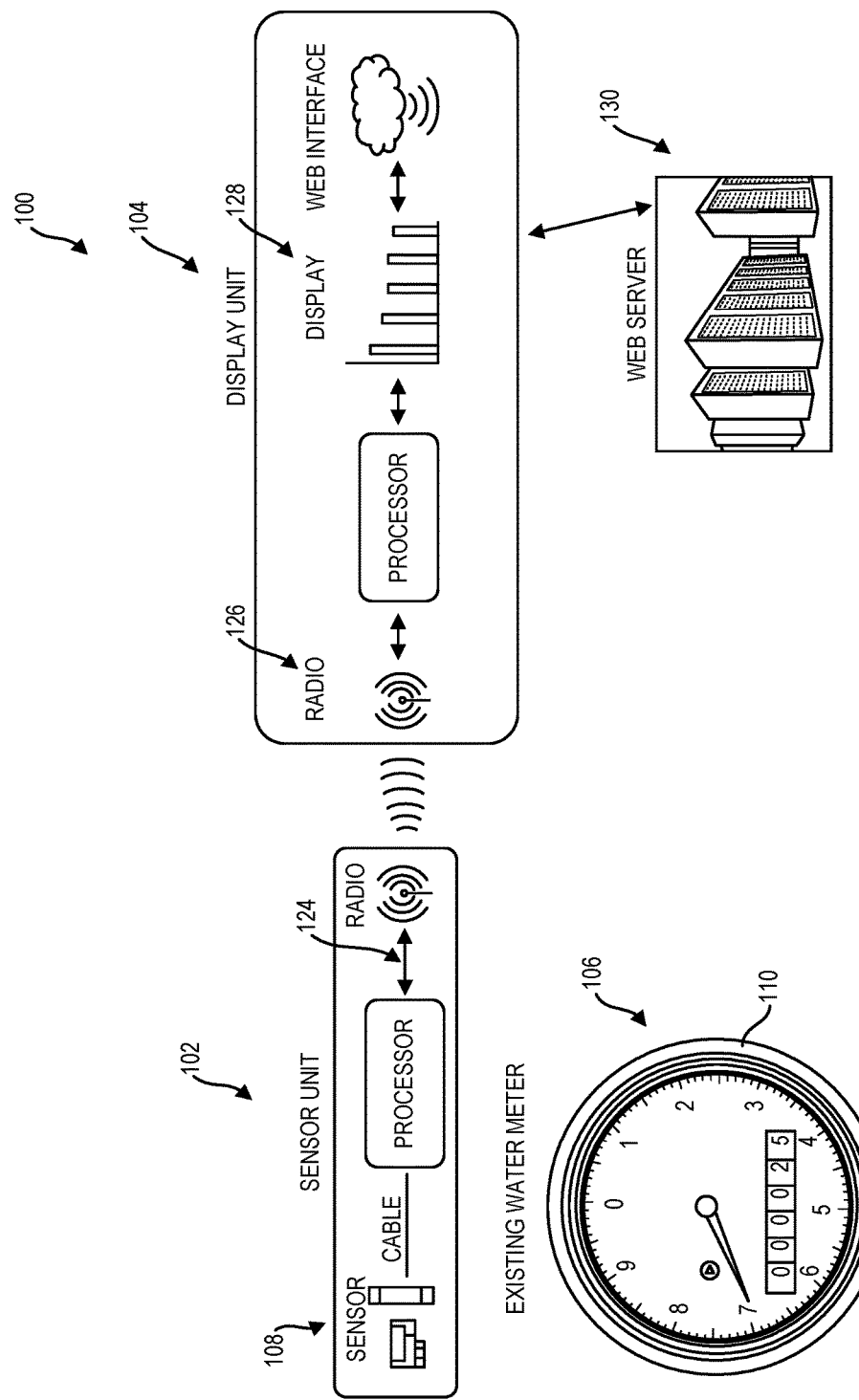
FIG. 1 is a schematic block diagram of an example system of the present disclosure.

While this invention is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

For purposes of brevity and clarity, the systems and methods of the present disclosure will be described with various use cases involving water flow detection. These examples are non-limiting and intended only to be descriptive of example methods of use. The systems and methods of the present disclosure are intended for use in measuring the flow of any fluid.

In one example, a system of the present disclosure can be installed proximate a natural gas meter that measures the flow of natural gas through a conduit. Some embodiments can measure the flow of gas through the pipe through direct measurement of gas flow when the systems are mounted directly to the conduit. The systems can also indirectly measure the fluid flow by sensing operations of the gas meter. For example, if the gas meter turns a numerical dial, the sensor used in the system of the present disclosure could sense the rotations of the dial. The system would infer flow volume based on dial rotation.

For context, water is a valuable resource and the need for conservation is ever increasing especially in areas of the world faced with water scarcity. There are several ways to promote water conservation from increasing awareness of the public of the need for conservation and providing incentives, to increasing the price of water usage and imposing limits in consumption. All of these have in common the need to measure water usage and water meters are generally employed to measure use and for billing purposes.

Several systems are either in place or have been proposed to measure water usage for residential, commercial, agricultural and industrial applications. From the most common systems where a water meter is read monthly by the water company operator and the data used for billing purposes to automated systems that use wired or wireless communications for automated reading of water usage. Systems have also been proposed for water information systems with the purpose of increasing awareness of water usage. Although the use of automated systems to measure utility consumption, including water, has been proposed and demonstrated for decades, the fact remains that the actual implementation and use of such systems has had a relatively low adoption rate. Moreover, implementation of proposed systems either represent a significant undertaking by utility companies or a potentially costly and complex project for residential, commercial, agricultural and industrial applications. Simplified automated water metering systems have been proposed for residential use aimed at increasing water usage awareness and yet, even these systems have had limited acceptance and implementation.

Key barriers to wide implementation and use of residential automated water metering systems are system complexity and cost.

System complexity refers to requirements for the installation and use of the system. In most cases hardware and software installations are required. The hardware installation includes either a water meter if none is in place or a means for automatic reading of an existing meter, as well as wiring or wireless communication hardware. Software installation includes connecting, downloading and installing applications in a computer or another communication device such as a Smart Phone. Depending on the system, installation by a professional is required, creating inconvenience and increasing cost. Even the simplest existing or proposed systems require tools for hardware installation and some familiarity with computer and/or communication devices for software installation. These represent significant barriers for adoption.

Other aspects of complexity are the ease and convenience of use. Systems that have been implemented or proposed require either login into a computer and/or Internet account or downloading an application for use with a smart phone, both demanding some knowledge and technological savviness on the part of the user.

System cost is another barrier for adoption as even low cost systems can experience cost escalation due to installation costs. If a water meter is not in place, the cost of the meter and installation, which can be in the hundreds of dollars, will discourage adoption. Lower cost systems are possible in cases where a water meter is already installed and an add-on system is used to automate the existing metering system, but even those systems can cost a few hundred dollars.

To these ends, the present disclosure provides systems and methods that provide real-time measurements of water usage and is low-cost and easy to install. Hardware installation of the devices of the present disclosure requires no tools, no expertise, and no software installation or setup is required. These unique features address the main issues that have prevented wide spread adoption of water usage monitoring systems. Methods of the present disclosure utilize specialized algorithms to make the system insensitive to sensor location during installation, which makes the installation simplistic. The systems will increase awareness of water usage leading to more efficient water use, increased conservation and reduced costs for residential, commercial, agricultural and industrial applications. These systems and methods also provide a low cost solution for automated and remote reporting of water usage and billing by water companies. The systems of the present disclosure can be integrated with home, commercial and industrial automation systems to enhance their capabilities through the measurement of water consumption. The systems of the present disclosure can also be used with fluids other than water.

The systems of the present disclosure address key barriers to adoption of automated water metering systems. The systems of the present disclosure provide a low-cost, turn-key solution that is easy to install, requiring no special skills and no professional installation of either hardware or software. In fact, hardware installation of these systems requires no tools and basic operation requires no computer, no smart phone and no software installation at all.

FIG. 1 is a schematic diagram of an example system 100 of the present disclosure that is designed to work with existing water meters without interfering with their operation and measurements. The system comprises two main components plus a power charger or power source. In one embodiment the system 100 comprises a sensor unit 102 and a display unit 104.

The display unit 104 is an example of a receiving system that can be used to receive and process water flow signals, as well as display water flow event data. Other examples of receiving systems include, but are not limited to, a cloud-based computing environment or another computing system that is located remotely from the system 100.

The sensor unit 102 is mounted to a water meter 106 by placing a sensing element 108 adjacent to a housing 110 of the water meter 106.

In some embodiments the sensor unit 102 comprises the sensing element 108 and electronics 112 for signal processing and communications with the display unit 104. In some embodiments, water flow signals are processed within the electronics 112. Example water flow signal processing methods are described in greater detail infra. In other embodiments, the system 100 transmits the water flow signals to a receiving system for processing.

Figure 20:
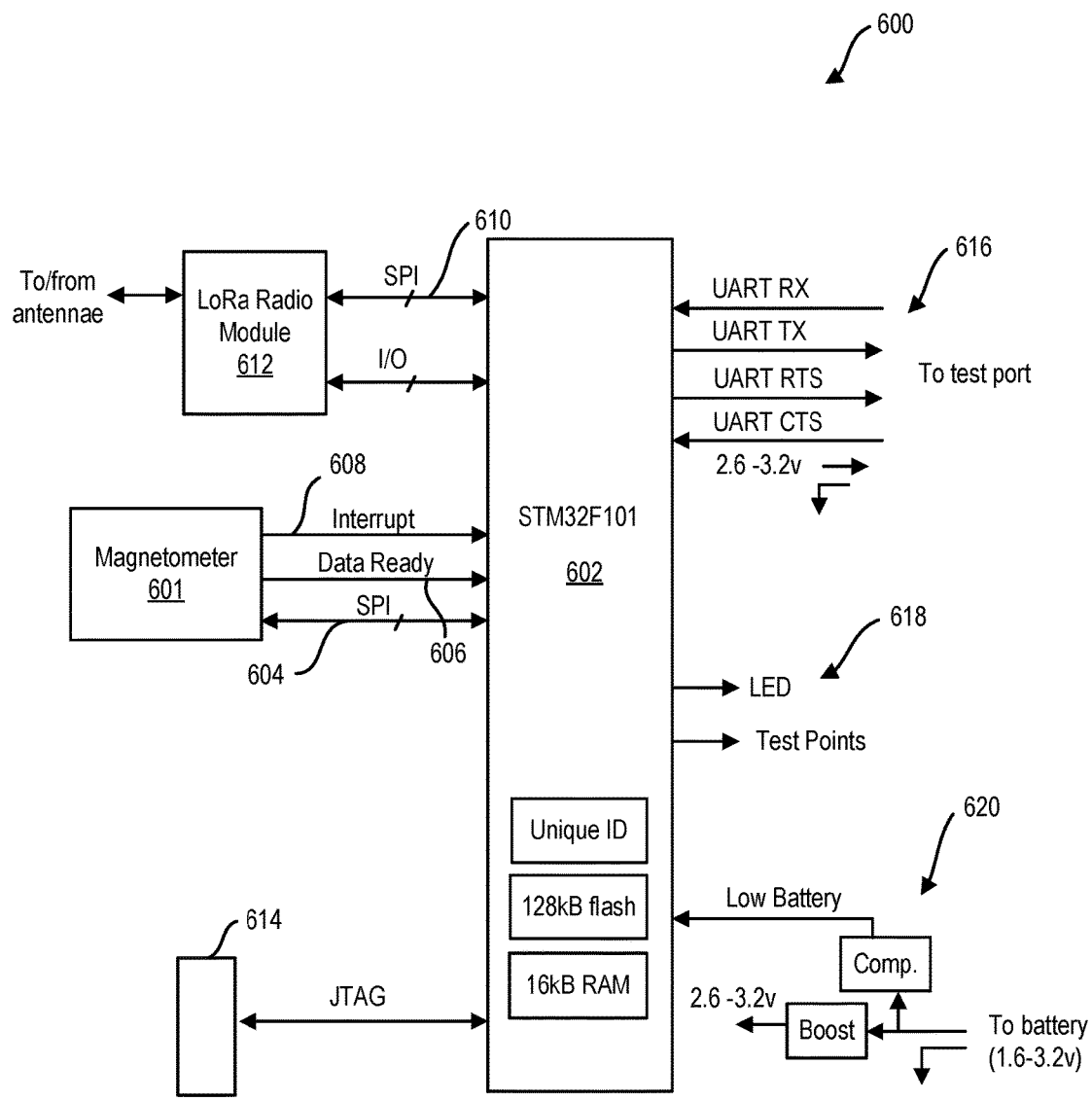
FIG. 20 is a schematic diagram of a circuit (electronics) for a sensor unit that is incorporated into systems of the present disclosure.

An example embodiment of the electronics 112 is illustrated in FIG. 20. A communications interface 124, which is included in the electronics 112 is illustrated in FIG. 1.

The sensing element 108 can comprise a magnetic sensor for use with existing water meters that use magnetic coupling. Use of a magnetic sensor prevents mechanism contact with water. In another embodiment the sensing element 108 comprises an ultra-sound sensor for embodiments where a water meter is not installed. Other fluid flow sensing devices can also likewise be utilized in accordance with the present disclosure.

Although a number of magnetic sensor technologies can be used to read the signal from most water meters, some embodiments comprise a 3-axis ultra-sensitive magnetometer. This magnetometer is utilized in conjunction with proprietary electronics and algorithms (incorporated into the electronics 112) that enable system performance that is largely insensitive to sensor placement on the water meter 106 and to water meter 106 model and type In some embodiments, the sensing element 108 senses rotation of a rotator within the water meter 106 and infers water flow based on revolutions of the rotator that are magnetically sensed. To be sure, as water flows through the water meter 106, the rotator of the water meter 106 begins to rotate. Each revolution of the rotator is equivalent to a volumetric amount of water flow through the water meter 106. For example, a single revolution of the rotator may be equivalent to one fiftieth of a gallon of water flowing through the water meter 106. The movement of the rotator will cause a dial on the face of the water meter 106 to incrementally count up to indicate volumetric flow rate through the water meter 106.

Thus, the sensing element 108 senses a full revolution of the rotator and produces a water flow signal that is a digital signal that is indicative of the flow—being one fiftieth of a gallon. This measurement coupled with measurement of elapsed time allow the computation of flow rate, for example in gallons per minute. The sensing element 108 can sense full or partial revolutions as well, and can convert the same to a digital signal. The microprocessor of the system 100 (described in greater detail below) can be configured to determine how the sensing element 108 infers water flow based on the specific operational aspects of the water meter 106. This is due to the fact that not all water meters may use the same volumetric measurements for a specific rotator movement.

In general, the sensing element 108 is configured to sense water flow events and generate water flow signals that are transmitted to the display unit 104 or other receiving system such as a cloud. The water flow signals can be processed to determine to classify a nature or type of the water flow events sensed by the sensing element 108. User feedback can be utilized in water flow event determinations. For example, the user can utilize the display unit 104 to input selections of water flow event types to train the system 100 when a water flow event is sensed.

Also, it will be understood that the sensing element 108 does not interfere with the physical operations of the water meter 106. That is, the sensing element 108 senses movement of components within the water meter 106 without touching any of the components within the housing of the water meter 106. For example, if the sensing element 108 is a magnetometer, the magnetometer senses a magnetic field of the rotator of the water meter 106 but does not alter the operations of the water meter 106 during operations.

When the water meter 106 is configured to obtain digital measurements of water flow rather than using a mechanical means such as a rotator, the sensing element 108 can comprise a device that is configured to sense the operations of digital components within the water meter 106 such as the oscillations of a switch, or other similar electronic component operations that would be included in a digital water meter (e.g., smart meter).

In other embodiments the system 100 can self-calibrate, apply signal processing filters to reduce signal noise, dynamic auto-range fluid flow signals to enable processing weak, asymmetrical, and varying frequency of the fluid flow signals, selectively cause the system to awake and sleep to conserve power, as well as other methods that are described in greater detail herein.

In some embodiments, the display unit 104 comprises a communications interface 126 and a display 128. The display unit 104 can be communicatively coupled through Wi-Fi interface 131 with a cloud-based computing environment or web server 130 which stores raw and/or processed water flow signals, as well as other metrics calculated regarding the water flow.

Figure 2:
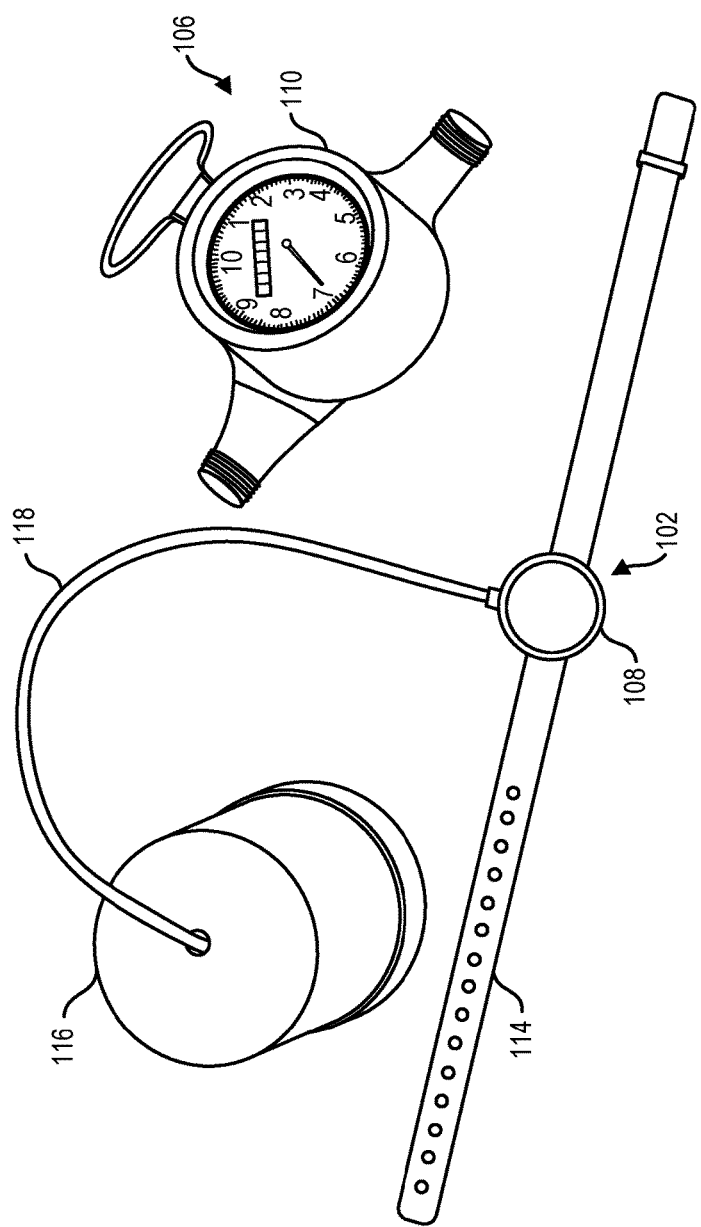
FIG. 2 illustrates an example system of the present disclosure for use with a water meter.
Figure 3:
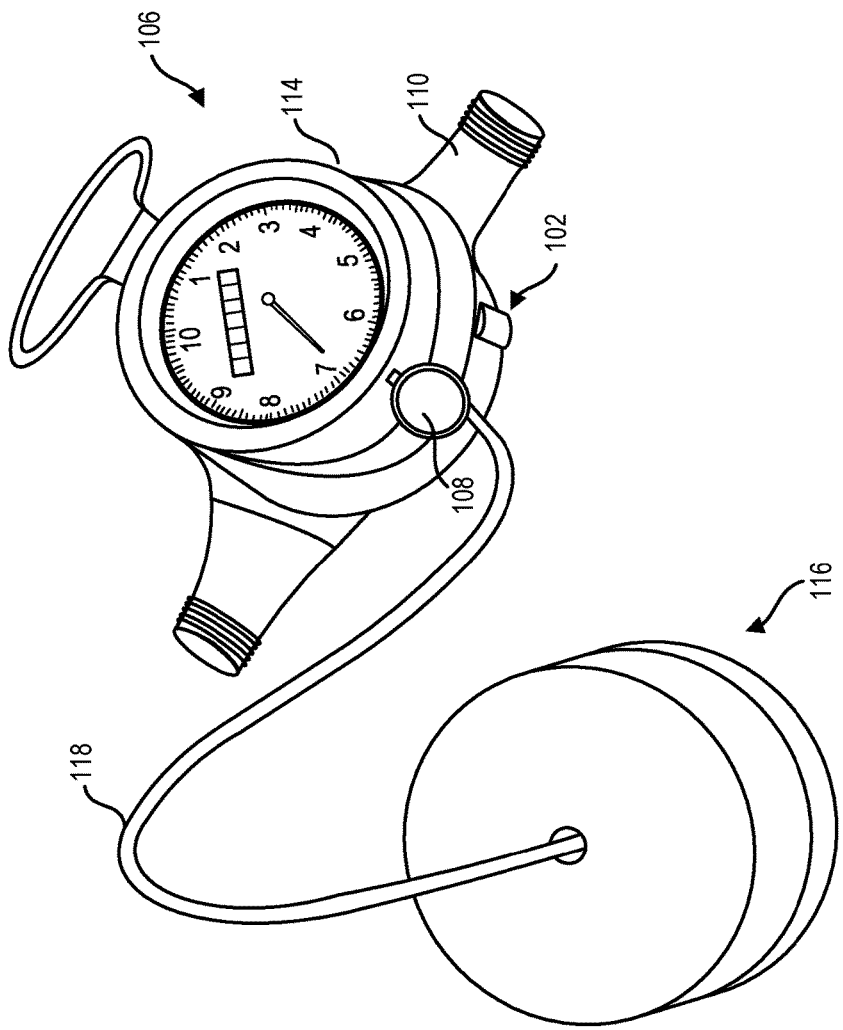
FIG. 3 illustrates the example system of FIG. 2 installed on the water meter.

FIGS. 2 and 3 collectively illustrate the system 100 prior to coupling with the water meter 106. In some embodiments the sensing element 108 is coupled with an attachment band 114. The attachment band 114 placed around the water meter 106 and secured in place by a pin-hole arrangement similar to those used in a belt. The electronics 112 are disposed within a component enclosure 116. The communications interface for communication with the display unit can be disposed within component enclosure 116 or along the attachment band 114. For example, the attachment band 114 comprises a strip of material that is provided with a plurality of apertures. An opposing end of the strip of material comprises a post/pin. When the attachment band 114 is placed around the water meter 106 the end of the strip of material that includes the apertures is looped over the pin and secured in place by engaging one of the apertures around the pin. The attachment band 114 can be manufactured from a resilient or elastomeric material in some instances which facilitates securement. In some embodiments, the material selected for the attachment band 114 is capable of withstanding degradation from water or other aspects of the ambient environment.

In some embodiments the electronics 112 is disposed within the component enclosure 116 and is electrically and/or communicatively coupled with the sensing element 108 using a cable 118. The system 100 is water proof and is mounted to the water meter 106 without the need of any tools. The component enclosure 116 is placed proximate the water meter 106.

Figure 4:
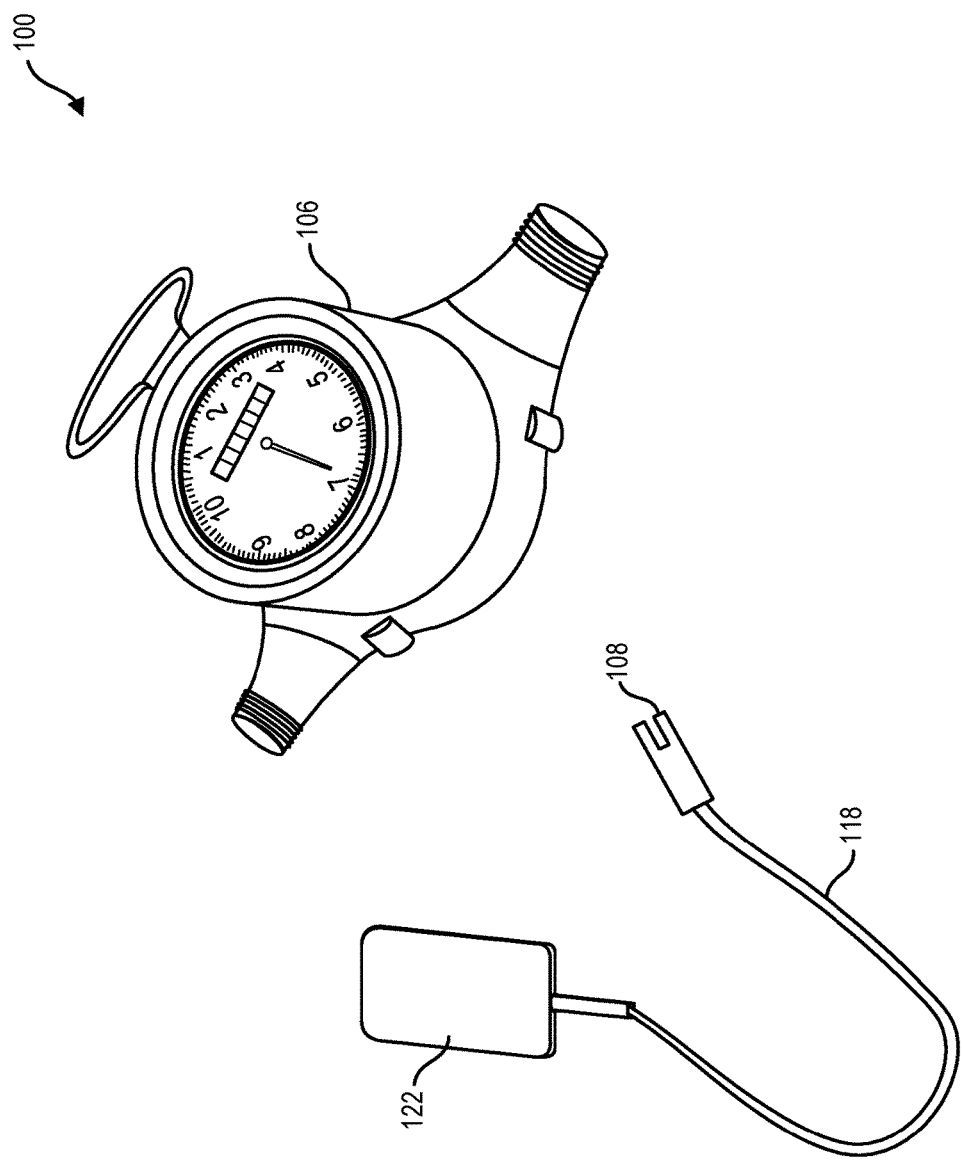
FIG. 4 illustrates an example system of the present disclosure for use with a water meter.
Figure 5:
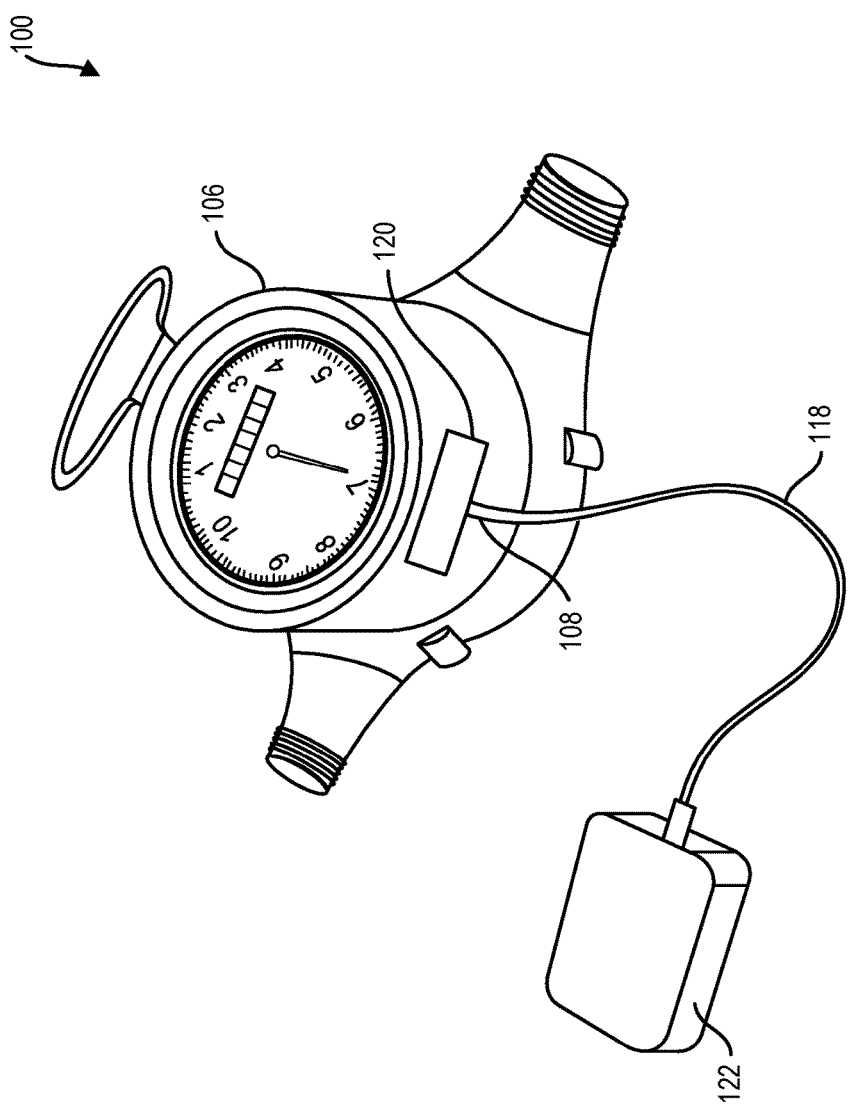
FIG. 5 illustrates the example system of FIG. 4 installed on the water meter using an adhesive tape.

FIGS. 4 and 5 illustrate another embodiment where the sensing element 108 is attached to the water meter 106 using adhesive tape 120. The user needs only to clean an outer surface of the water meter 106 and apply the sensing element 108. This trivial operation requires no special skills, no professional installation, and no tools. The sensing element 108 and electronics are connected by a cable 118. The electronics are hermetically sealed within the component enclosure 116. The user needs only to place the sensor unit 102 near the water meter 106 and turn on the sensor unit 102 using an on/off switch 122. The sensor unit 102 is battery powered (located in the component enclosure 116) and designed with features that enable long time operation before the need to replace or recharge the batteries.

Figure 6:
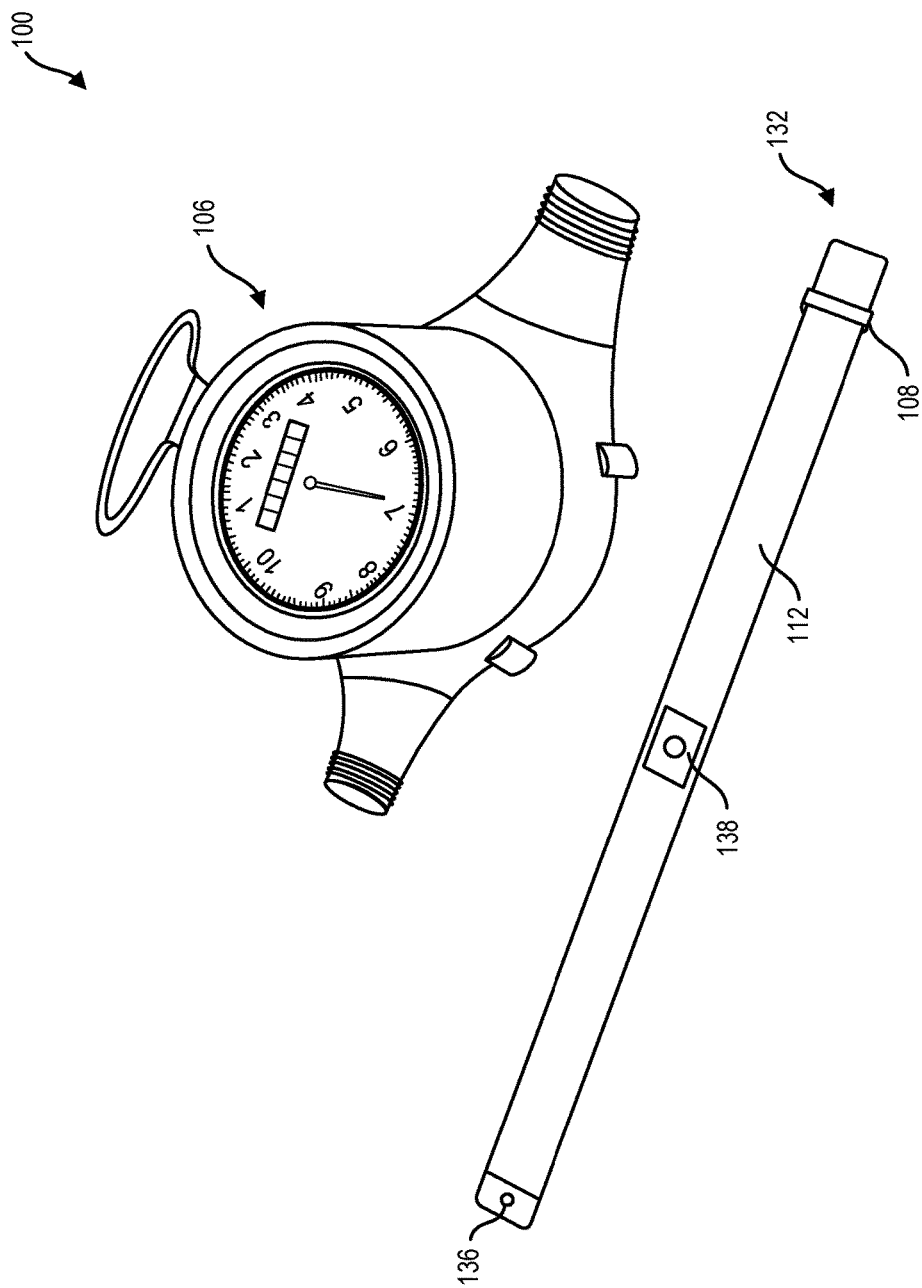
FIG. 6 illustrates an example strap integrated version of a system of the present disclosure for use with a water meter.
Figure 7:
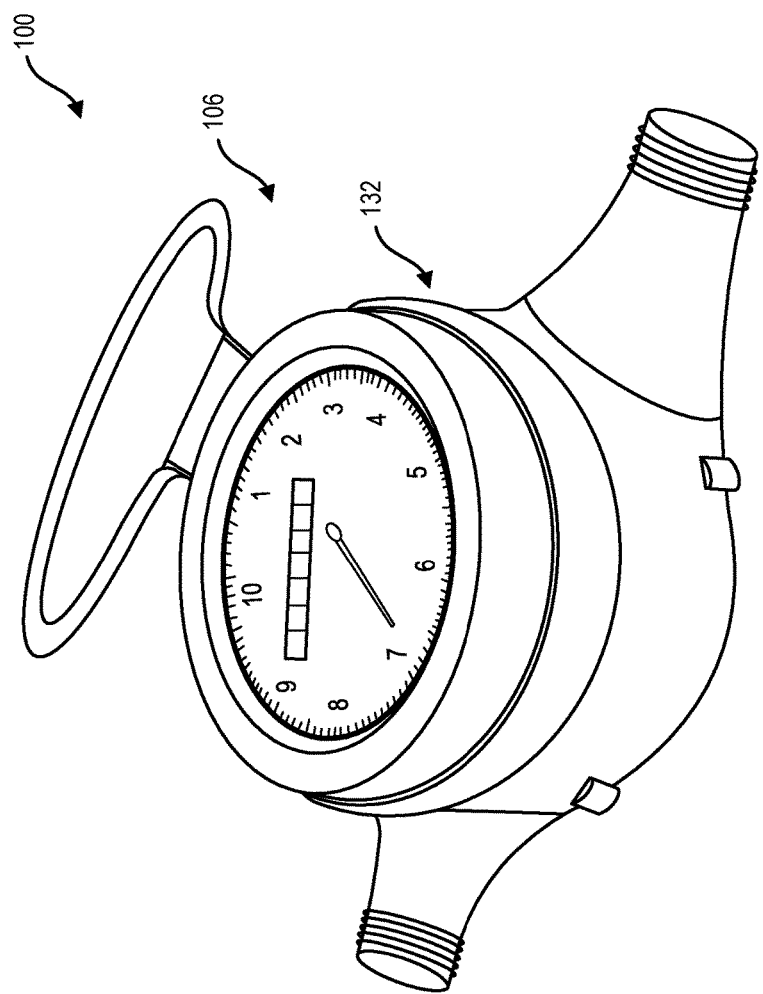
FIG. 7 illustrates the example system of FIG. 6 installed on the water meter.

FIGS. 6 and 7 collectively illustrate an alternate implementation of the system 100. In this embodiment the sensing element 108, electronics 112 and batteries are integrated into a single compact unit as a strap 132. In this embodiment the strap 132 is placed around the water meter 106 housing and is held in place by a design that incorporates an elastic band with hook and loop style fasteners or a buckle similar to those used in belts or wrist watches, or hook and loop fasteners, by way of non-limiting examples.

Upon power on, the sensor unit 102 starts immediately collecting water flow data from the sensing element 108. Proprietary algorithms in the system 100 (e.g., instructions stored in memory and executed by a microprocessor) are used to perform adaptive ranging and threshold, data collection, processing, and transmitting the water flow data to a receiving system such as the display unit 104. Data processing includes filtering, validation, compression, and encryption—just to name a few. Data transmission to a display unit is performed through a wireless interface but can also be performed though a wired electrical or fiber-optic link.

Referring back briefly to FIG. 1, in one or more embodiments, the sensor unit 102 and the display unit 104 are paired by embedding a unique identifying code in their communications. This is particularly important for wireless radio communication between the sensor unit 102 and the display unit 104 in instances where there is more than one system 100 installed in a given proximate location, as it allows operation without interference between the plurality of systems. Pairing can be done at the factory or during initialization.

Returning to FIGS. 6 and 7, a tactile switch 136 on the sensor unit 102 is used to verify proper operation. When pressed, a LED 138 will blink rapidly a preset number of times (e.g. four) indicating power is on and, for a preset time (e.g. one minute) the LED 138 will blink whenever water flow is detected.

Figure 8:
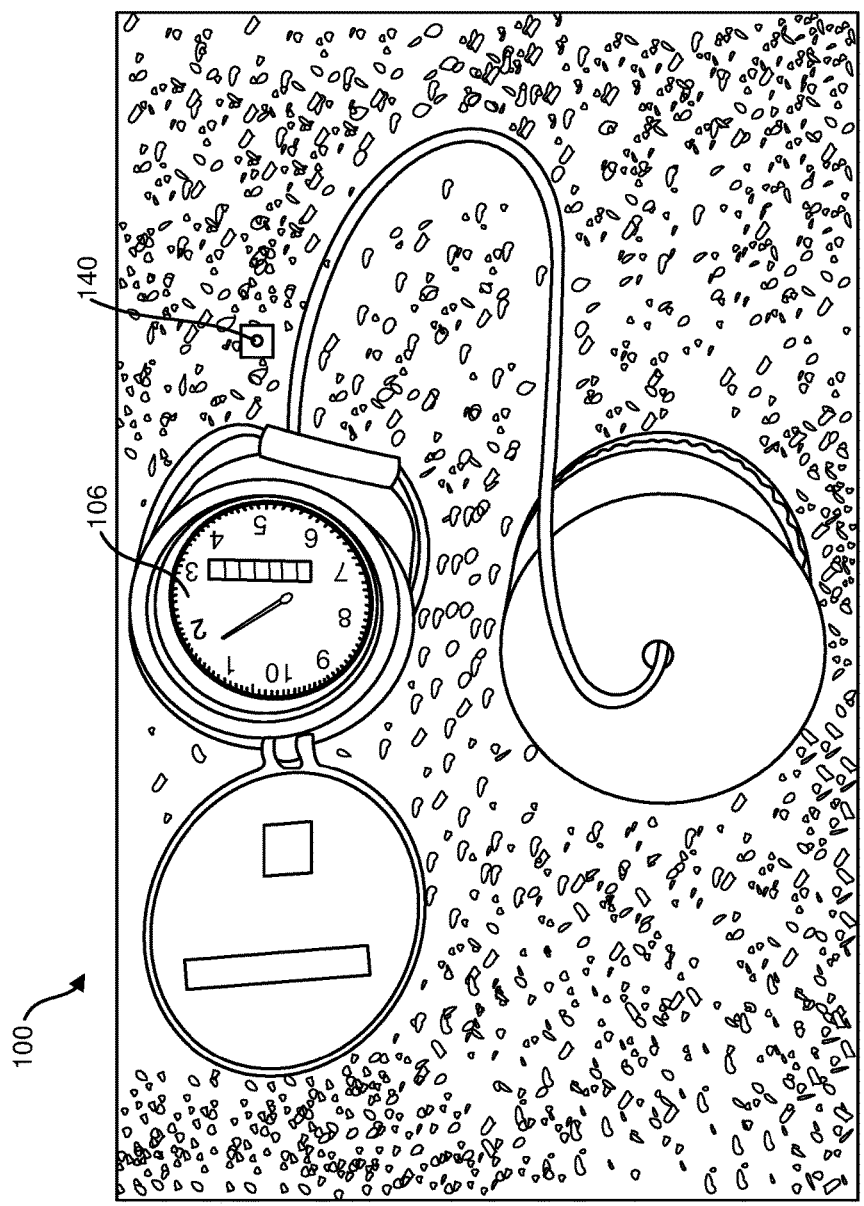
FIG. 8 illustrates an example system of the present disclosure installed on a water meter within an in-ground water meter enclosure.

FIG. 8 illustrates an example system 100 in combination with a water meter 106. In this installation, the water meter 106 is installed in-line with a water conduit 140 that supplies water to a structure (not shown).

Figure 9:
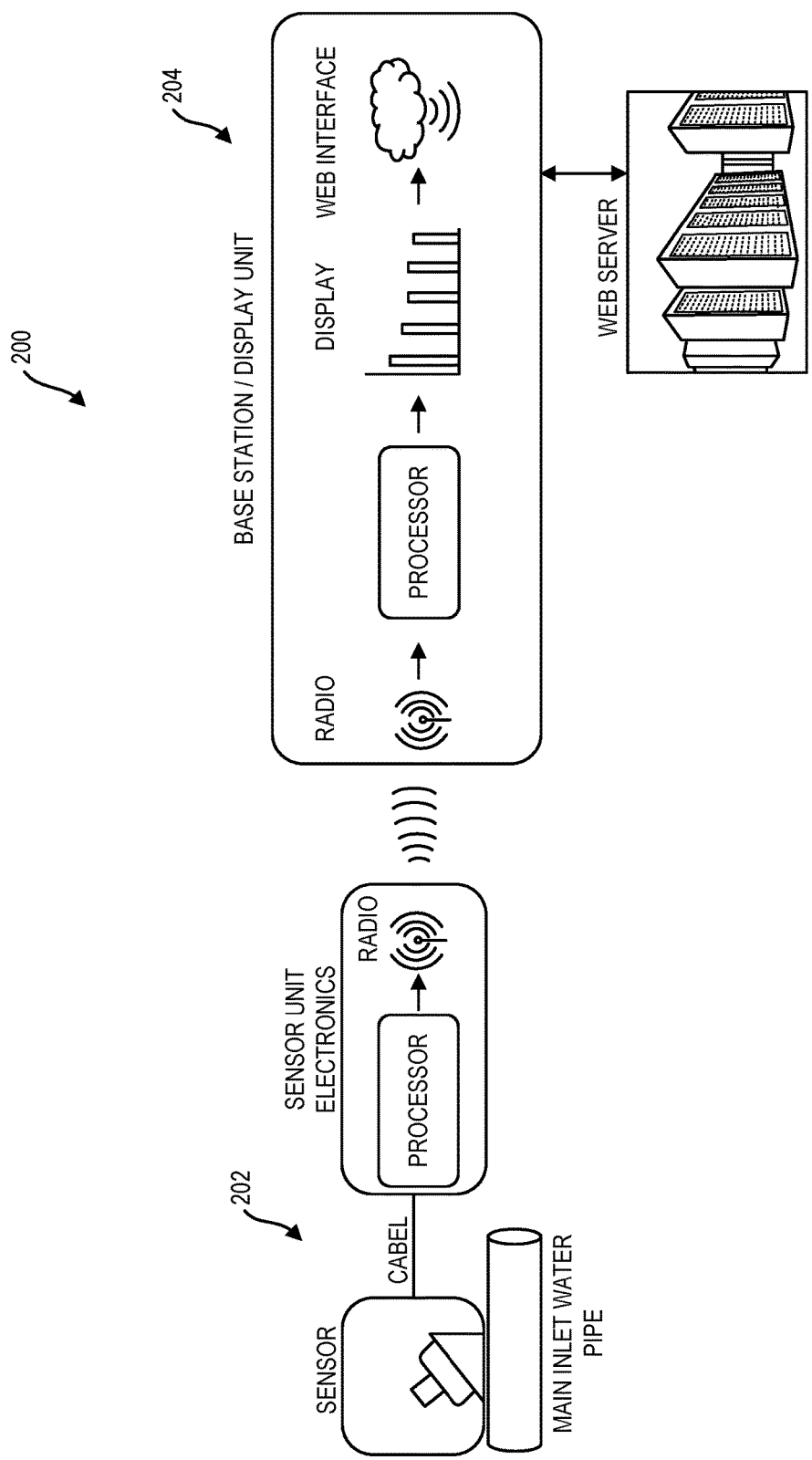
FIG. 9 is a schematic block diagram of an example system of the present disclosure.

FIG. 9 is a schematic diagram of another examples system 200 of the present disclosure. The system 200 is similar to the system 100 of FIGS. 1-8 with the exception that the system 200 comprises an ultrasonic sensor 202 that senses fluid flow through a conduit, such as water flowing through a utility pipe. The display unit 204 is identical to the display unit 104 in FIG. 1.

The system 200 can be utilized in locations where a fluid meter is not available or not present. It can also be utilized in apparatuses that also include a fluid meter. For example the system 200 can be utilized to check the accuracy of the fluid meter or capture a second water flow measurement used for any other purpose.

In this case, the sensing element comprises an ultra-sonic flow meter that is mounted to the main inlet water pipe (e.g., fluid conduit).

Figure 10:
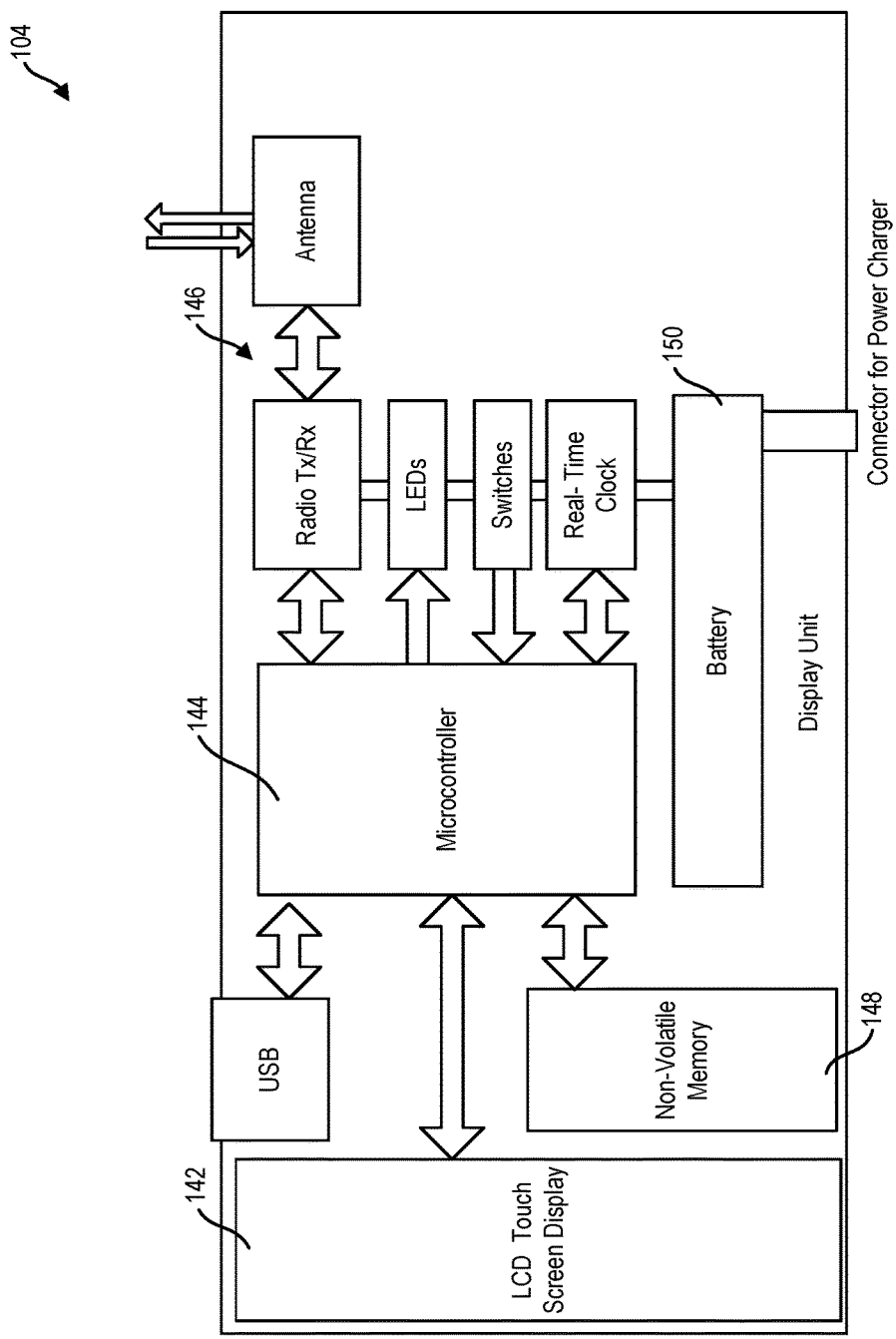
FIG. 10 is a schematic block diagram of an example display unit for use in a system of the present disclosure.

FIG. 10 is a schematic diagram of an example display unit 104 (alternatively display unit 204 of FIG. 9) that can be utilized in accordance with the present disclosure. The display unit comprises a display screen or touch display 142, a microcontroller 144 (e.g., microprocessor), a communications interface 146 (which comprises an antenna and a radio transceiver), a memory 148, as well as other ancillary components.

In one embodiment the display unit 104 is powered by a battery 150 and can be connected to external power using the charger provided (see FIG. 10). With the sensor unit attached (see FIGS. 2 and 3 for an example sensor unit) to a water meter and powered on, the display unit 104 will start displaying water usage in real-time once powered on.

Figure 12:
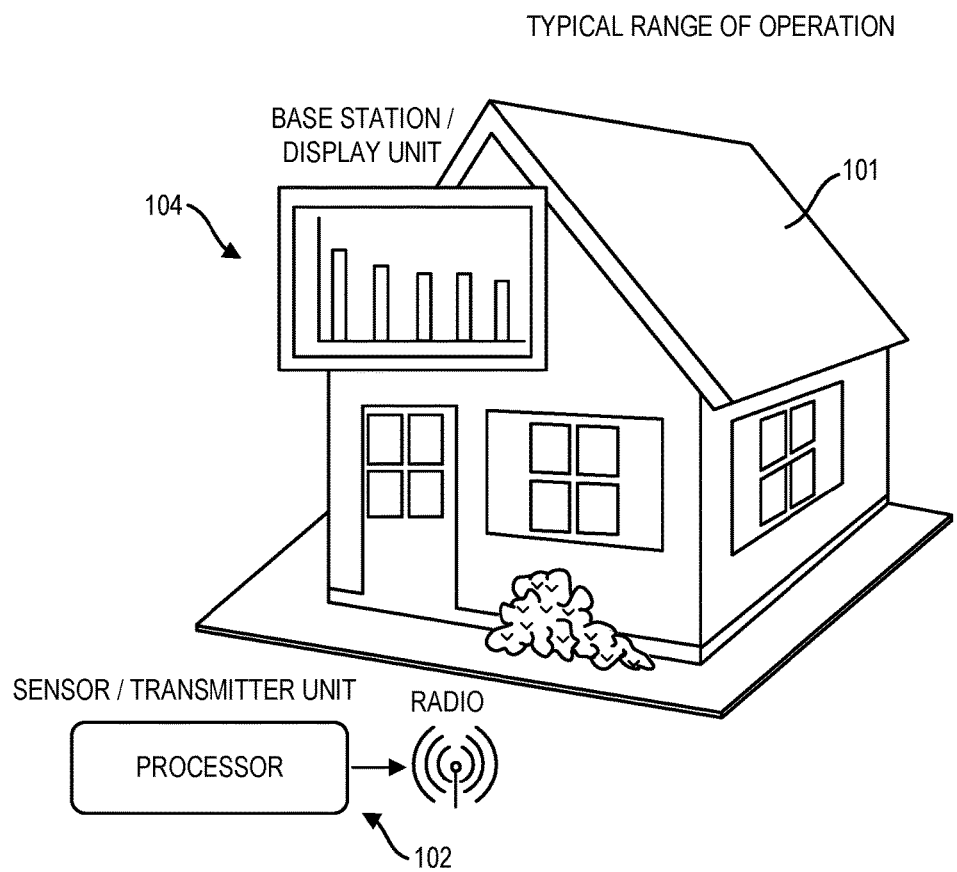
FIG. 12 illustrates an example system installed relative to a structure.

In one embodiment the battery is integrated into the display unit 104 and once charged can be disconnected from the charger and carried around operating within a prescribed distance range from the sensor unit 102, as illustrated in FIG. 12. The default range is selected to cover most residential properties and can be tailored for commercial, agricultural and industrial applications—just to name a few.

Figure 11:
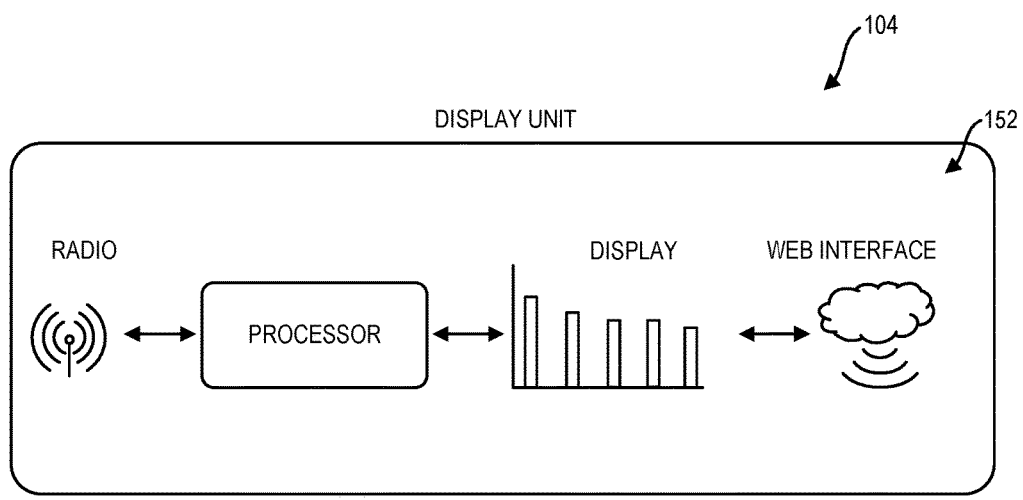
FIG. 11 is a schematic block diagram of an example system of the present disclosure.

The display unit 104 is also used to store water flow data that can be processed to analyze, compare and display usage trends and make recommendations on use changes that will lead to more effective water usage, conservation and reduced cost. These computations can occur within the sensor unit 102, within the display unit 104, or alternatively within a web server or cloud 152, as illustrated in FIG. 11.

FIG. 12 illustrates positioning of a sensor unit 102 in a water meter that is located outside a structure 101. The display unit 104 is located within the structure 101.

Figure 13:
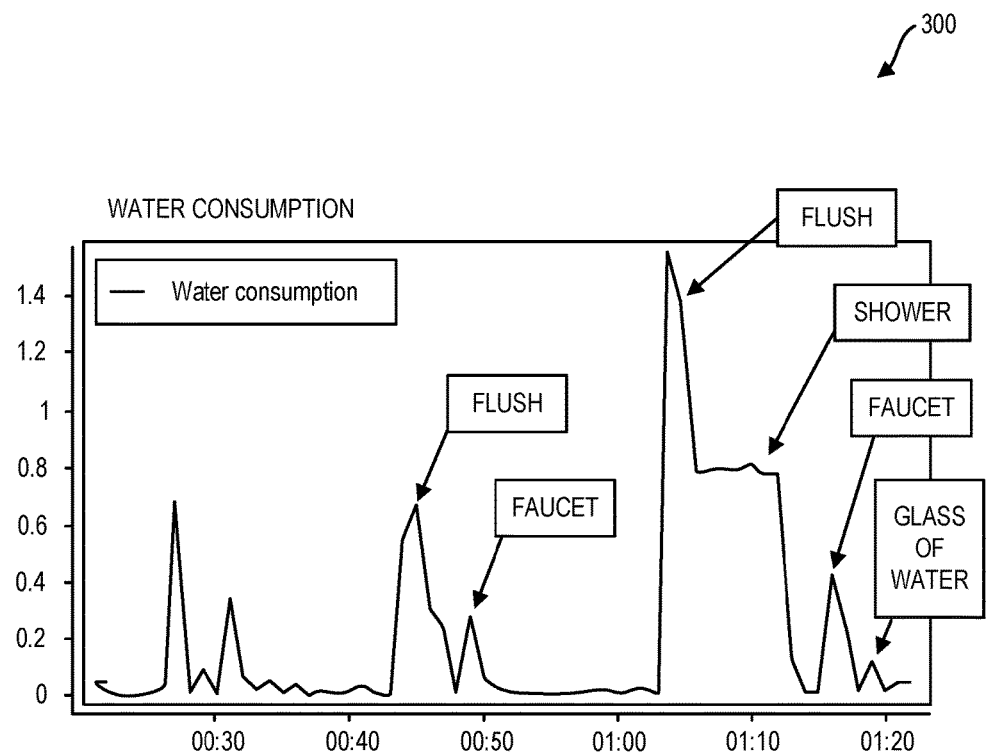
FIG. 13 is a graphical representation of water flow events in terms of water consumption versus time.

FIG. 13 illustrates an example water consumption graphical user interface 300 (GUI) that is displayed on the display unit 104. The GUI 300 illustrates the water consumption time history for typical water usage events. It is clear that each usage has a different profile, or signature, that is exploited by a feature extraction algorithm followed by an optimization algorithm capable of identifying multiple simultaneous water usage events, as disclosed in greater detail infra.

The GUI 300 illustrates multiple simultaneous water usage events such as a combined toilet flush and shower events, between the times of 01:03 and 01:12.

In another advantage, use of the display unit 104 allow for immediate leak detection as the display unit 104 alerts users of a potential leak or improper water use such as a faucet left open.

Figure 14:
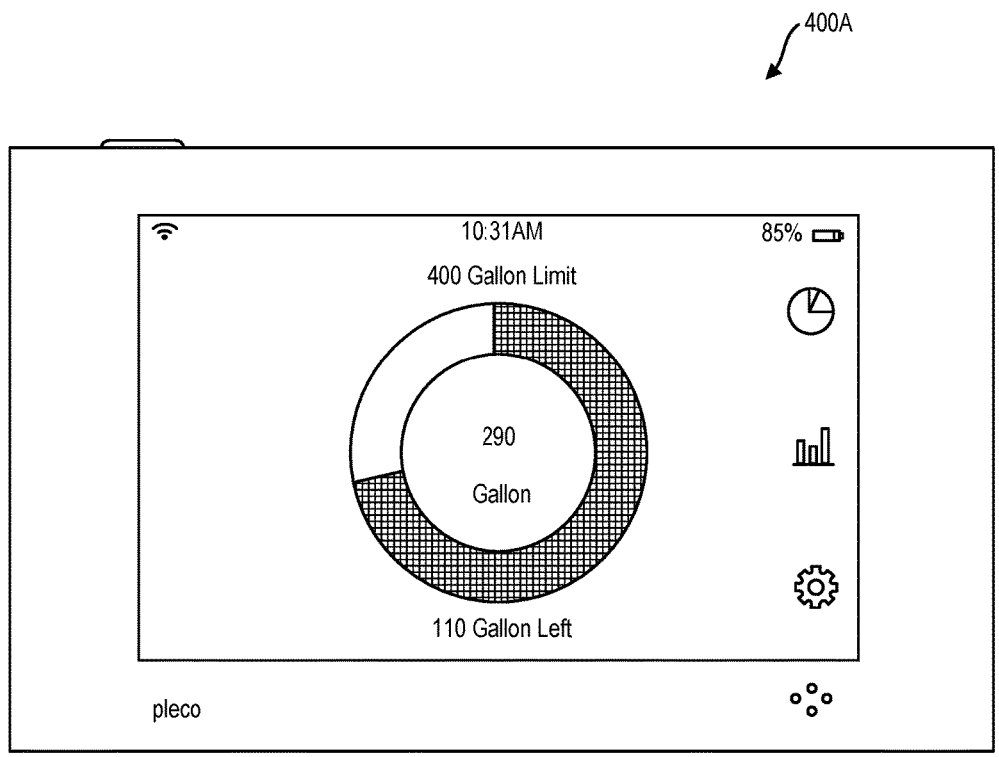
FIGS. 14-16 collectively illustrate various graphical user interfaces comprising water flow information that are displayed on a display unit.
Figure 15:
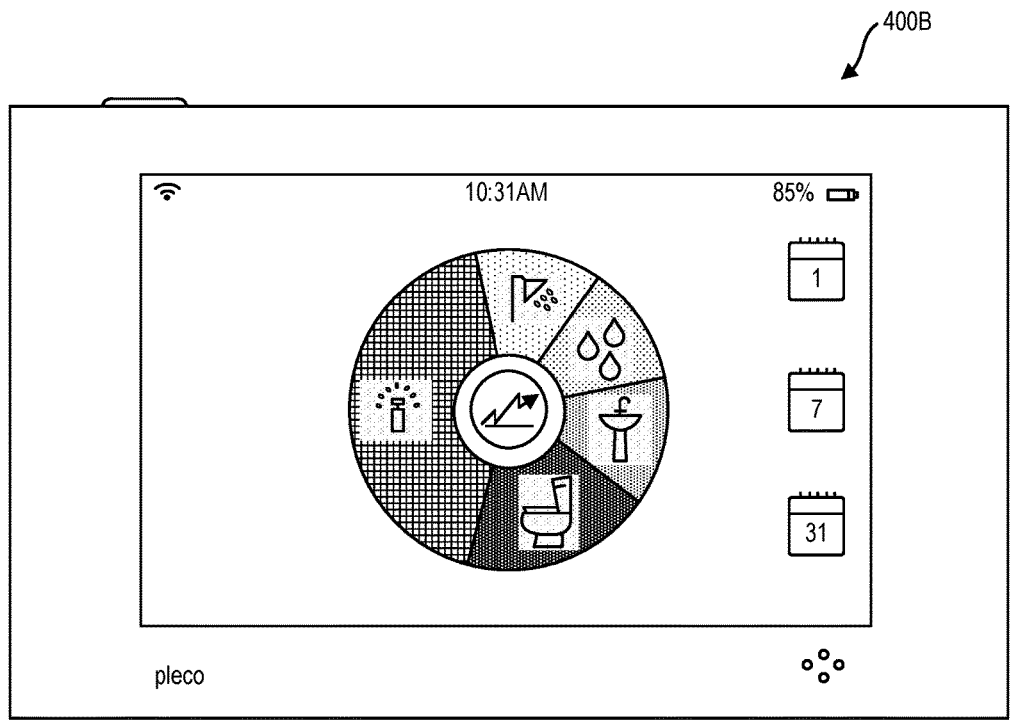
Figure 15:
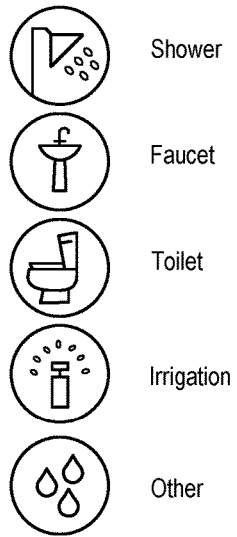
Figure 16:
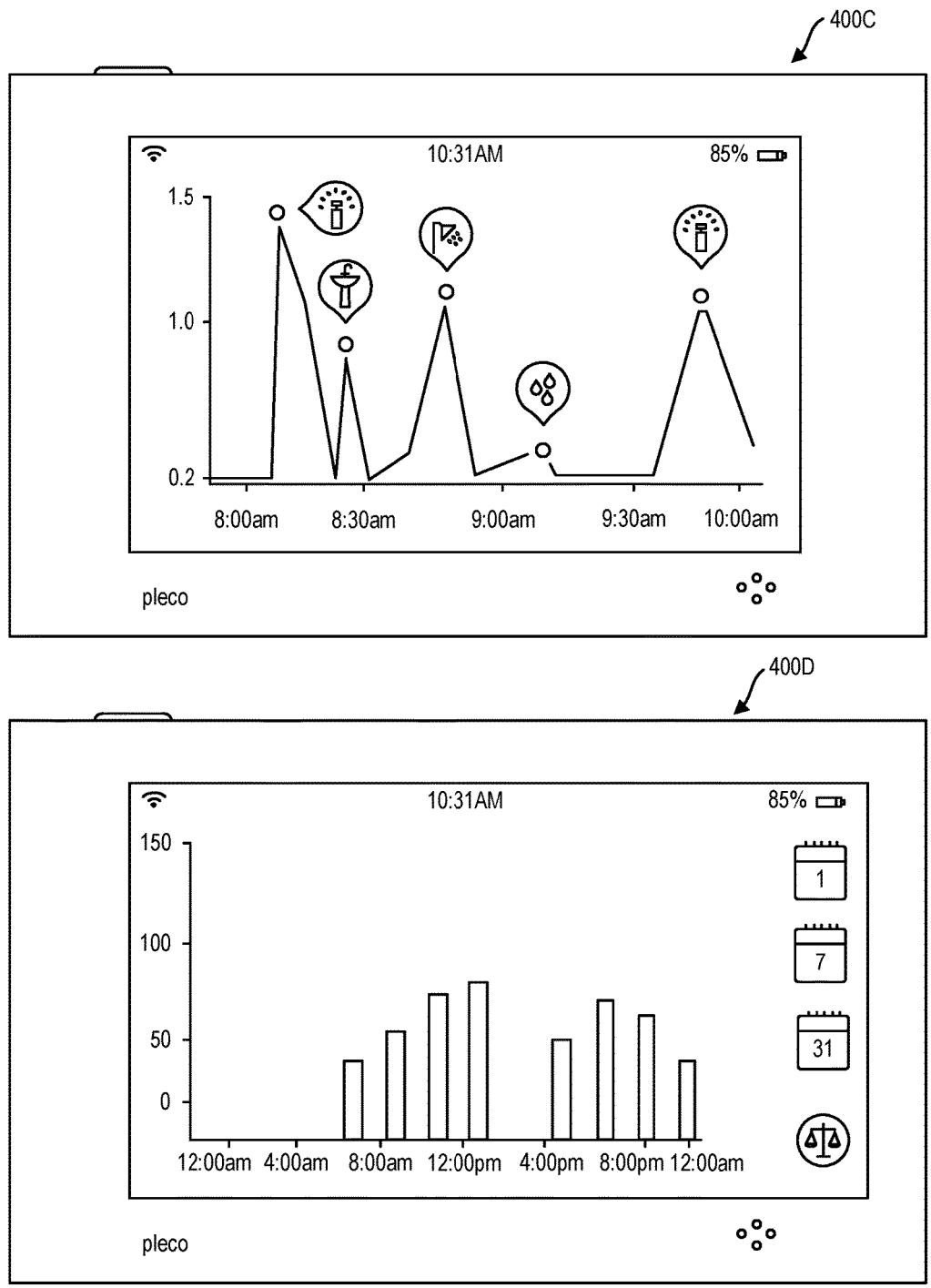

The display unit 104 has a simple navigation menu where the user selects different views of water consumption among pre-configured options. Other example GUI menus 400A-D are illustrated in FIGS. 14-16, respectively. An example legend that is descriptive of the water flow events is illustrated in FIG. 15.

Increased awareness of the water consumption is created by immediate feedback on water usage and several comparisons to other time periods and regional consumption. Different water uses such as sprinkler system, shower, flushing, have unique signatures that are exploited various algorithms described herein to detect details of water usage and inform the user. For example, a standard toilet flush will consume about 2.6 gallons of water in about 52 seconds and achieve flow rates in excess of 3 gallons per minute. A shower has a lower flow rate, about 1.5 gallons per minute but it is likely to last several minutes. A typical residential sprinkler system can easily exceed a flow rate of 14 gallons per minute. In addition to key parameters, such as water flow rate, duration of consumption and total usage, different water uses have different time profiles as shown as illustrated in FIG. 16.

Figure 17:
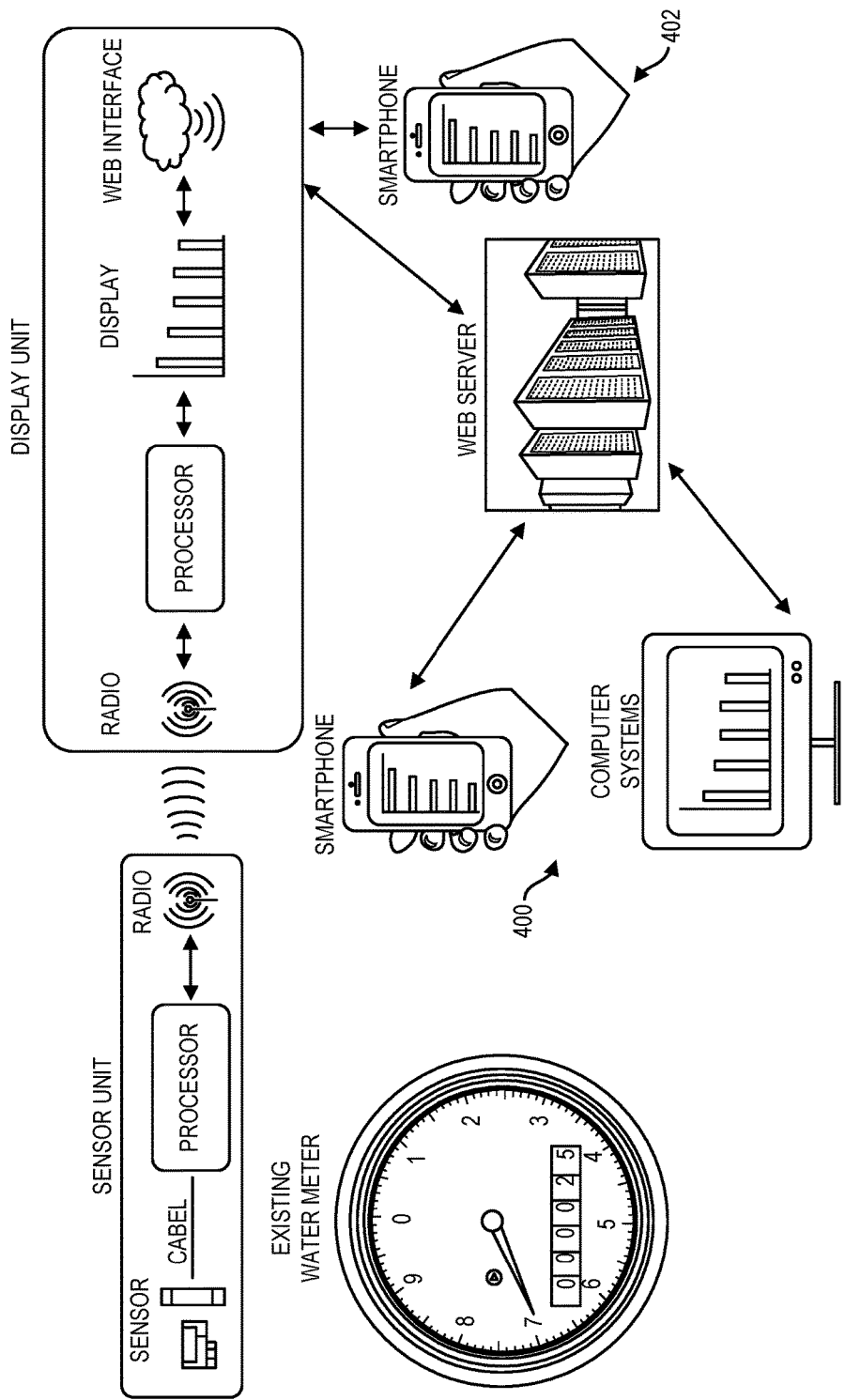
FIG. 17 is a schematic block diagram of an example system of the present disclosure that includes transmission of water flow data to remote systems.
Figure 18:
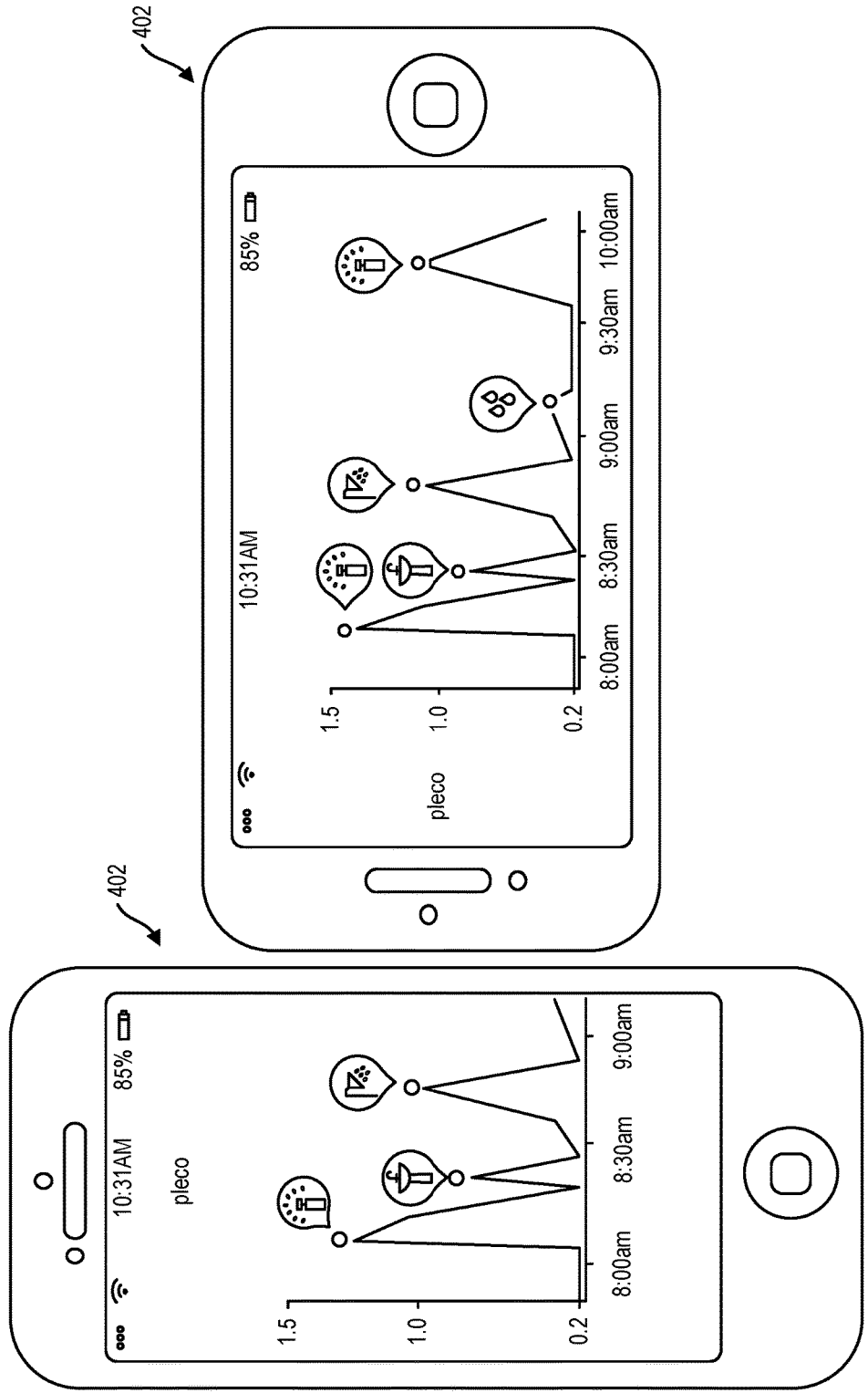
FIG. 18 illustrates various graphical user interfaces comprising water flow information that are displayed on a mobile device.

Referring now to FIG. 17, although not required, if the user desires the systems of the present disclosure can be setup to display data in a computer 400, Smart Phone 402 or other devices that would be known to one of ordinary skill in the art. Users who are technology savvy can exercise these options that require software installation. Nonetheless, these are not necessary for the basic operation of the systems of the present disclosure. FIG. 18 illustrates a screen of the Smart Phone 402 showing actual, real-time water usage data. This connection to the Smart Phone 402 can be directly from the display unit or through a web server.

When connected to the Internet, the systems of the present disclosure can receive automatic updates and anonymous regional water consumption information. In this case the user would be able to compare their water usage to regional data of other users.

Connection to the Internet or to wireless telephone network facilitates updates to the firmware of both display and sensor units.

Connection to the Internet or to a wireless telephone network enables provision of water usage information to utility companies or other agencies or interested parties. In this case, since the data contains information on patterns of use, it is expected that for privacy reasons detailed water usage would not be provided to the water company unless authorized by the user. Nonetheless, total water usage for a given period of time (e.g. weekly or monthly) can be provided and used for billing purposes. This represents a substantial streamlining of operations and savings for the utility companies.

Again, the systems described herein are designed for simple installation and requires no software installation or setup. The issue of complexity is addressed by design and enabled by the algorithms for automatic initialization, calibration and event recognition as described herein. Similarly, ease and convenience of use are addressed by design. The use of a computer, smart phone, or other devices is optional. The issue of cost is addressed by a simple design that uses an innovative and robust sensor electronics and firmware to implement the automated water metering system.

Figure 19:
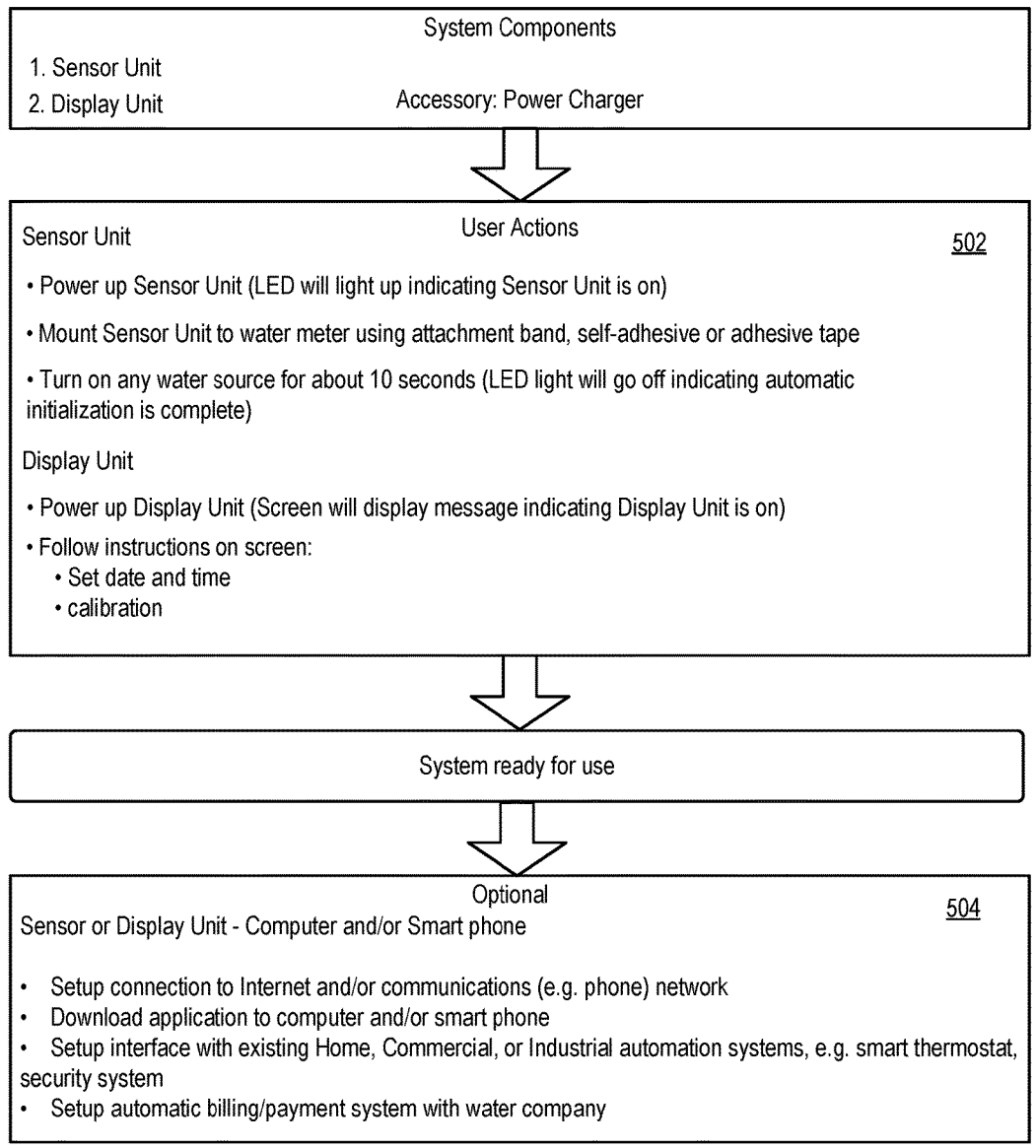
FIG. 19 is a flow chart of an example system initiation and use process with both user actions and transmission of data.

FIG. 19 is a flowchart that illustrates an example method for initializing a system of the present disclosure. Initially, a user attaches a sensor unit to a water meter and powers up the sensor unit and powers up a display unit (if utilized). User initiated actions are illustrated in block 502. After installation and initiation, the system is ready to use as illustrated in block 504. The system will automatically begin sensing water flow events and reporting real-time water usage thereafter.

Optional actions comprise communicatively coupling the system to the Internet and/or a communications network for display of information on a computer and/or smart phone or for automatic meeting and billing by the water company as in block 504.

In the following sections, the Sensor Unit, Display Unit and User Interface are described in more detail. System calibration and algorithms used to identify different types of water usage are also described in detail.

FIG. 20 illustrates a block diagram of an example sensing unit 600 that is representative of the sensor units described above, such as sensing unit 102, of any of the foregoing FIGs.

In embodiments where the system is used with existing water meters, the sensing unit 102 comprises a sensor element (magnetometer) 601 senses changes in the magnetic field generated by the magnetic coupling mechanism (e.g., rotator) in the water meter and the sensor electronics conditions and digitizes the signal for interfacing with a microcontroller 602 via SPI bus 604. Again, these systems can conduct direct and/or indirect measurements of water meter operations and calculate water flow metrics without affecting the operations and/or measurements of the water meter itself. That is, the water meter can generate water flow and provide a water flow measurement that is either analog (e.g., numerical dial) or digital (e.g., smart meter). This water flow measurement is referred to generally as a first water flow measurement. The systems of the present disclosure generate a second water flow measurement that is based on direct and/or indirect measurement of operations of the water meter. In some embodiments the first water flow measurement can be used in combination with the second water flow measurement. By way of example, the second water flow measurement generated by the systems and methods of the present disclosure can be used to verify the accuracy or monitor operations of the second water flow measurement. The second water flow measurement is compared with the first water flow measurement and if differences are detected the water meter may need to be tested. The second water flow measurement can be used to provide a digital water flow signal when the water meter can only generate an analog water flow measurement. This eliminates the need to replace legacy water meters with smart meters, which are expensive and require complex and time consuming installation, which also require tools and often professional installation.

In general, sensor element (magnetometer) 601 measures analog fluid flow measurements of the fluid meter such as rotations of a rotator within the water meter. This rotation is an analog signal that is sensed by the sensor element (magnetometer) 601 and used to infer volumetric flow rate. The analog rotation of the rotator is converted into digital water flow signals that are then further processed.

The magnetometer informs the microcontroller 602 that new data is ready to be read via DRDY (data ready) pin 606 at the programmed sampling rate. Additionally, the magnetometer informs the microprocessor 602 that a magnetic signal has exceeded a pre-programmed level by sending a signal to the interrupt pin 608. These two pieces of information are combined in a "Semi-analytical signal processing" algorithm executed on the microcontroller 602 to achieve the objectives of accuracy and low power consumption, as described below.

The microprocessor 602 comprises a second SPI bus 610 which is used for communications with the long range (LoRa) radio module 612. In a low data rate operational mode (used for increased communication range), the LoRa radio module 612 achieves the objectives of long range and low power due to the low duty cycle. A radio and antenna are used for communication with a display unit and/or other devices on the Internet, communications network, and/or commercial and industrial automation systems. The LoRa radio module 612 allows the system to be "IoT ready", that is, with minor firmware updates it is capable of transmitting data directly to the Internet of Things networks being installed on large scale throughout the world. This will enable the system to communicate directly to user devices like Smartphones without the need of a display unit.

The JTAG 614 and UART 616 ports are used for programming, testing and debugging of the system. A Light Emitting Diode (LED) 618 is used to indicate completion of self-calibration and adaptive threshold, as well as low battery power and data transmission. A power boosting circuit 620 allows maximum extraction of power from batteries extending battery life. It also signals low-battery condition to the microprocessor 602.

The microprocessor 602 comprises a unique ID defined by a manufacturer. This ID is used for pairing the sensor unit to a display unit (or other receiving system) uniquely identifying the sensor unit. Again, this allows multiple systems to operate in close proximity to each other without interference.

The microprocessor 602 runs various signal processing algorithms for self-calibration and adaptive threshold detection that enable placement of the sensor element in any location that is proximate the water meter. The microcontroller 602 processes sensor signals (e.g., water flow signals) and computes water flow metrics such as gallons per minute as well as total water usage, gallons, and time tags the data. The system has a power on-off switch and a health monitoring switch (optional).

Figure 21:
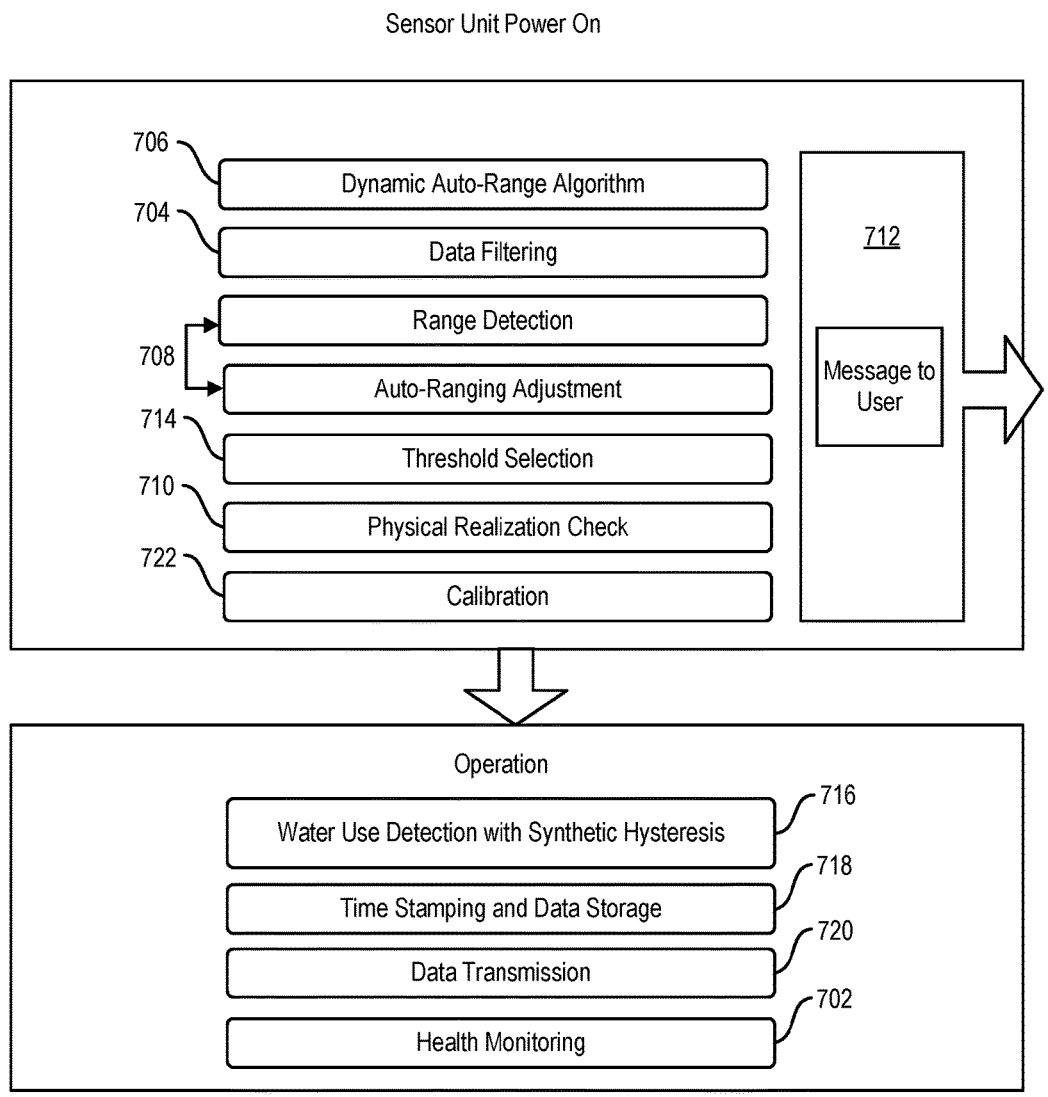
FIG. 21 is a diagram of example algorithms used by systems of the present disclosure, including systems that utilize magnetometers as sensing elements.

FIG. 21 illustrates various routines/algorithms that are stored in memory and executable by a processor. The processor can include the microprocessor in the sensing unit, the display unit, and/or an external system such as a web server or cloud.

In some embodiments, upon power on, the sensor unit monitors key operational health parameters 702, turns the warning LED on and immediately starts running a data filter routine 704 and dynamic auto-ranging routine 706. Examples of health parameters include total current drawn, battery power and if applicable, communication handshake with the display unit.

In some embodiments, the dynamic auto-range detection algorithm selects a most suitable combination of a 3-axis vector measurement (used by the sensor unit) and determines a measurement range 708, which is then adjusted through bias and scale factor. With the data filter and dynamic auto-range parameters determined, a check is conducted using a physical realization routine 710 of the measurements. If any of these steps fail, the unit sends a message 712 to the user via a warning LED and/or a text message sent to the display unit. The user is asked to initiate any water usage to exercise the system. In such case, the system re-starts initialization.

For example, a location for the sensing element might have resulted in measurements that are close to the end of the scale and of relatively small magnitude between minimum and maximum readings, in which case an offset is used to shift the water flow signal away from an end of a scale allowing subsequent amplification without saturation. This is followed by the threshold selection algorithm 714 that determines the key parameter(s) used for conducting the magnetic cycle measurements.

If a problem occurs at any point during initialization, the system will notify the user via an LED signal and/or text message sent to the display unit. The initialization takes about 10 to 15 seconds to complete in some embodiments.

In one or more embodiments, system calibration is facilitated using the display unit. In some embodiments, unique signatures for water usage events are used as part of the self-calibration algorithms 722 to ensure proper accurate measurements. Algorithms for these water event classifications are described in greater detail herein.

Once the initialization is completed, the system moves into operational mode and the LED on the sensor unit is turned off to conserve battery. In this mode, the sensor unit is executing water use detection algorithms 716 based on the parameters established during the initialization described in the previous paragraphs. For example, in the case of an existing water meter, the sensor is counting magnetic cycles that are proportional to water usage. The measurements are made as a function of time allowing computation of flow rate. In the case where a water meter is not installed, the sensing element comprises an ultra-sonic flow meter that provides measurements of flow rate that are integrated in time to compute water usage.

During operation, water flow signals that are interpreted as measurements are time stamped in process 718, stored in the local memory, and transmitted to the display unit in process 720 (or other remote device) in real-time. The sensor unit is in bidirectional communication with the display unit to optimize data transmission rate and minimize power use in the sensor unit. Health monitoring algorithms are executed in the regular operational mode and monitor data integrity, validity (subset of physical realization routine), as well as battery power. To further extend battery life, radio frequency (RF) power level is constantly monitored and adjusted with an adaptive RF Power Level routine, which is described in greater detail below.

If the system detects no water flow, the system is put into a sleep mode. In this mode, most of the processes occurring on the microprocessor are turned off. In some embodiments the processor is programmed to wake up on an interrupt from the sensor unit based on threshold detection. The sensor unit is programmed to enter low power mode and the radio (e.g., communications interface) is shut down. This process is described in more detail with respect to a semi-analytical cycle detection algorithm described below.

When using a sensor unit that is coupled to an existing water meter, the sensor unit detects a change in magnetic field due to the rotating magnetic coupling used in most water meters to avoid mechanism contact with water. It will be understood that there are multiple magnetic cycles for each mechanical turn of the coupling magnet. Therefore, if the number of magnetic cycles can be accurately measured, such information can be used to compute the water flow rate through the flow meter and integrated to calculate water usage in a given period of time. The amplitude, phase, and offset of the magnetic field sensed by the sensor unit may vary with respect to a location of the sensing element on the water meter. Moreover, a direction of the magnetic field is also sensitive to location of the sensing element and the measurements need to be made so as to not exclude a rotation as this would lead to inaccurate metering of water usage.

In some embodiments, the sensing element comprises an ultra-sensitive magnetoresistive sensing element that measures the magnetic field vector in 3-axis providing magnitude and direction. The present disclosure utilizes an algorithm to process 3-axis measurements and compensate for changes in magnitude, phase, and offset ensuring that the magnetic cycles caused the mechanical rotation of the water magnet are identified in real-time irrespective of the location of the sensing element on the water meter. For example, for some locations of the sensor unit relative to the water meter, the measurements of magnetic field change in one axis may dominate the readings while the other two axes show little change, in this case the algorithm will increase the weight given to the sensitive axis and might discard the measurements in the other two axes if they have a low signal to noise ratio.

Figure 22:
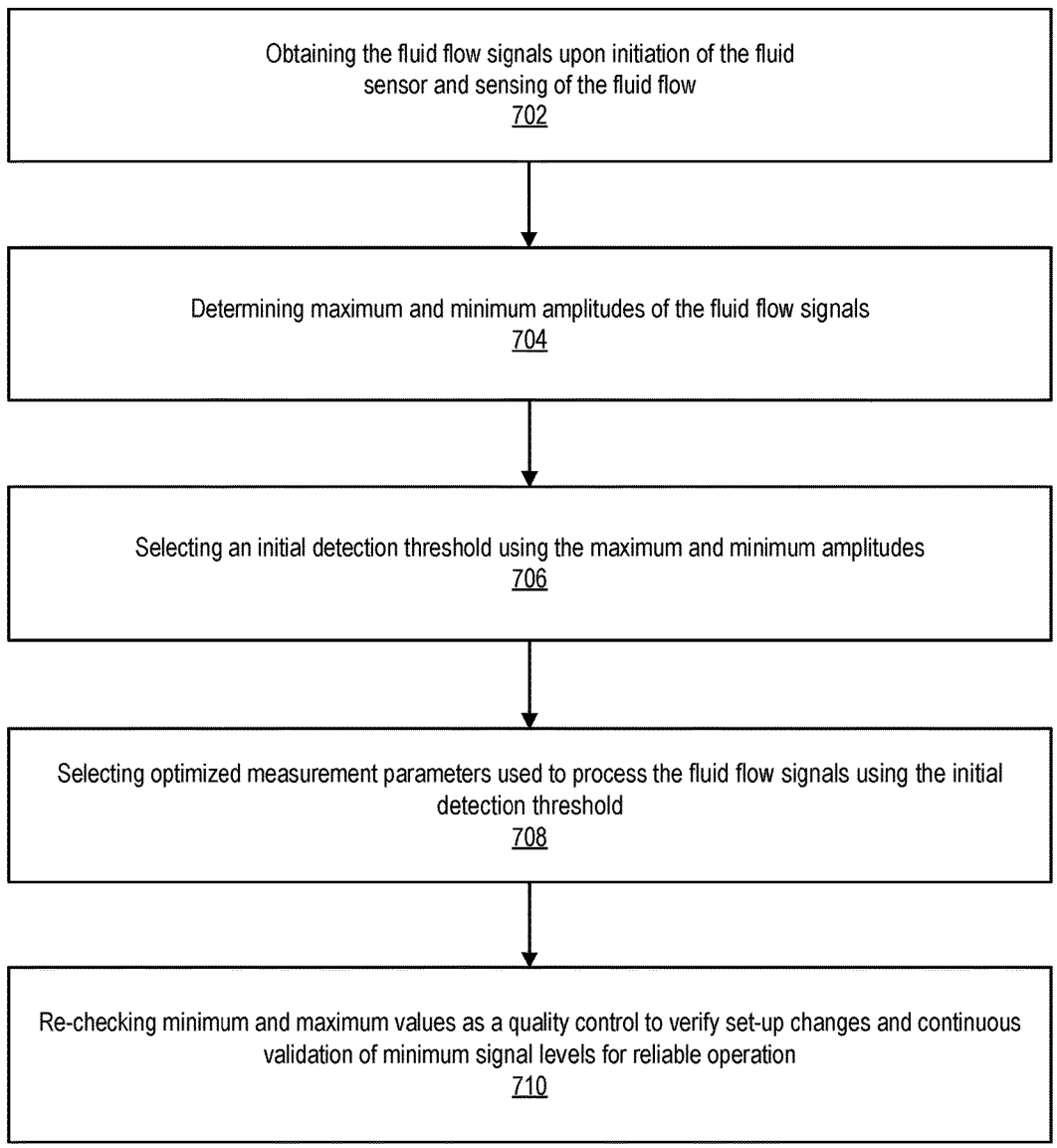
FIG. 22 is a flow chart of an example method of the present disclosure.
Figure 31:
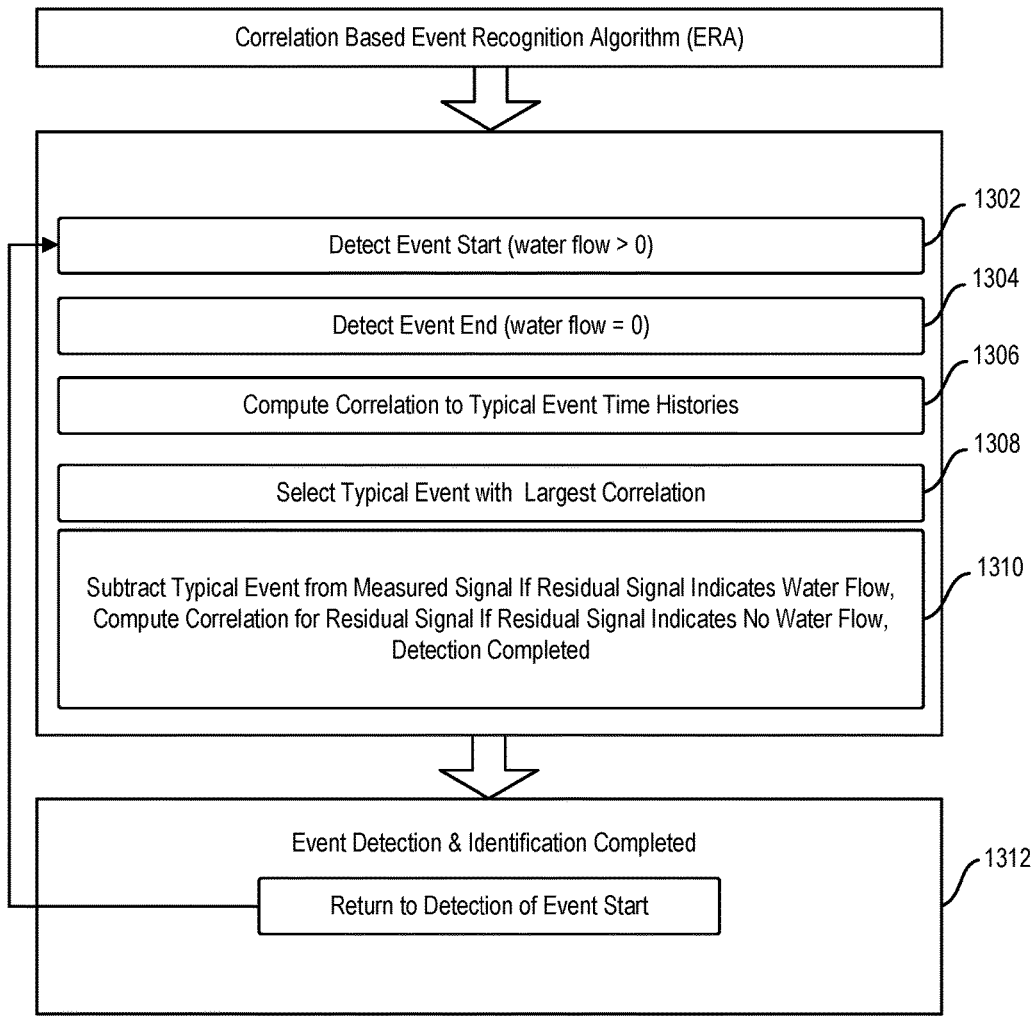
FIG. 31 is a flow chart of a correlation based event recognition algorithm of the present disclosure.

FIGS. 22 and 31 are illustrative of various algorithms that are executable by the systems of the present disclosure to process water flow signals obtained during operations. In some embodiments, some of these algorithms are utilized when the sensing element is a magnetometer.

For example, the use of a magnetometer style sensing element may encounter noise when sensing the operations of the water meter. To reduce the noise the system is configured to implement a data filter signal processing algorithm samples measured with the magnetic sensor.

A typical residential water meter will read maximum flow rates from between 20 to 50 gallons per minute, which results in a bandwidth of interest and therefore the required sample rate from 100 to 500 Hz. In some embodiments the sensor unit uses a 1,000 Hz sampling rate. For commercial, agricultural and industrial applications higher rates are required and can be accounted for based on operational parameters in each individual case.

In some embodiments a first order (single pole, low pass) filter in continuous time with corner frequency $F_f$ in Hertz: is utilized and functions according to the following:

$$q_f = \frac{w_f}{s+w_f}q_m, \quad \text{(Equation 1)}$$

where $w_f=2\pi F_f$, is the Laplace transform variable, $q_m$, is the measured signal and $q_f$ the filtered signal.

Using a Tustin transform the discrete equivalent of Equation 1 for a sampled data system with uniform sampling period $T_s$ in units of seconds is:

$$q_f|_k = \frac{(2-w_fT_s)}{(2+w_fT_s)}q_f|_{k-1} + \frac{w_fT_s}{(2+w_fT_s)}q_m|_k + q_m|_{k-1}, \quad \text{(Equation 2)}$$

where the index k indicates the current sample and k−1 the previous sample.

Measured magnetic sensor data is filtered using the above equations. A single or double pole low pass filter is sufficient to reduce noise effects and achieve acceptable signal to noise ratio above the bandwidth of interest.

As mentioned above, a dynamic auto-ranging algorithm can be executed by the system to compensate for weak, asymmetrical and varying frequency water flow signals.

Again, a water flow signal to be measured by the sensor unit can vary in amplitude, offset, frequency, and phase. These variations occur due to background magnetic fields from Earth and man-made nearby artifacts, magnetic sensor sensitivity and offset, water meter brand, model and construction, placement of the sensor on the water meter, water flow rate and other factors—just to name a few.

Figure 23:
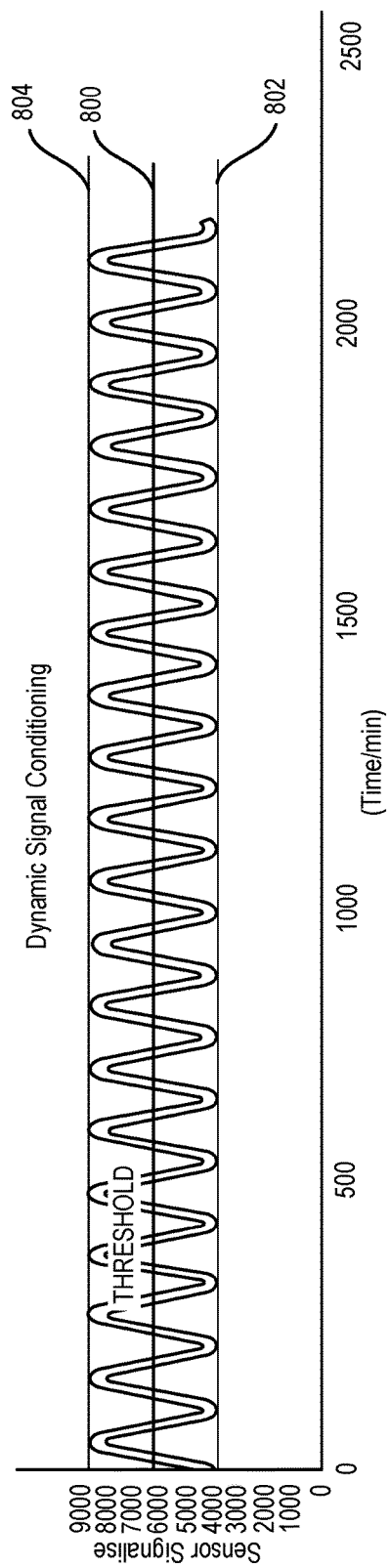
FIG. 23 illustrates a dynamic signal conditioning graph.

The process illustrated in FIG. 22 and described below is provided to reliably detect pulses under challenging and varying conditions described above. FIG. 23 illustrates signal processing occurring during execution of the method of FIG. 22.

In some embodiments, the method comprises a step 702 of obtaining the fluid flow signals upon initiation of the fluid sensor and sensing of the fluid flow. An initial detection threshold is established at the middle position 800 between a minimum signal level 802 and a maximum signal level 804.

In more detail, upon initialization of the system and water flow occurring, a few seconds of data is measured and the maximum and minimum amplitudes of the fluid flow signals are determined in step 704. These measurements provide an amplitude and offset of the signal.

An initial detection threshold is selected in step 706 using the maximum and minimum amplitudes.

In some embodiments, the system performs a step 708 of selecting optimized measurement parameters used to process the fluid flow signals using the initial detection threshold. That is, the detection algorithm selects a most suitable combination of the 3-axis vector measurement and determines the measurement range, which is then adjusted through bias and scale factor. Bias adjustment comprises adding a constant value to center the signal within the measurement range and scale factor by multiplying the signal to maximize measured value within measurement range.

During operation, the minimum and maximum values are re-checked as a quality control to verify set-up changes and continuous validation of minimum signal levels for reliable operation in step 710.

The system can also implement a physical realization algorithm to determine if the system is installed properly and water is flowing.

In some embodiments, the system is configured to detect water flow using a semi-analytical cycle detection algorithm and a synthetic hysteresis implementation, as illustrated in the following flow charts.

The characteristics of the water flow signal to be measured include noise, varying frequencies, and asymmetries, which make the development of circuit and firmware for magnetic field threshold crossing detection a challenge, requiring innovative approaches.

Semi-Analytical Cycle Detection

The system uses a semi-analytical cycle detection procedure to improve accuracy and conserve battery power. The system relies on interrupts from the threshold crossing detection at the sensor element to wake up using the synthetic dual sensor technique described below and then performs analytical computations at the microprocessor using the synthetic hysteresis implementation described below only while fluid flow is detected.

For context, analyzing every sample of the data from the sensing element all the time would consume excessive battery power. On the other hand, trusting only the threshold detection on the sensor unit would trigger numerous false interrupts to the microprocessor due to the low signal to noise ratio. This noise cannot be clearly filtered without impacting lost pulses or frequency limitations due to the extreme range frequencies of the measured signal when the fluid flow rate varies from very low to very high.

Synthetic Dual Sensor

In some embodiments, the system is configured to prevent system wake-up (and battery consumption) due to noise with using a synthetic dual sensor algorithm.

To conserve battery, when no water is flowing, the system goes into sleep mode. Most systems on the microprocessor are turned off. The system is programmed to wake the processor up on an interrupt from the sensing element based on a threshold detection. In one embodiment, the sensor is programmed to a sample data rate of 20 Hz (low power, enough to detect threshold crossing at any flow rate), where the radio is shut down.

For context, a drawback of programming a system to wake up on a single pre-determined threshold level measurement is that if the water meter stops measuring water flow in such a position that the sensor signal is close to the pre-determined threshold, the signal noise will cause the system to trigger multiple times even if there is no water flow.

This occurrence may happen when the sensing element is positioned at a place on the fluid meter where low signal amplitude (maximum-minimum) is obtained (e.g. 1,200 MSB) and the noise is high (e.g. 400 MSB peak-to-peak).

Such situation can be detected by the system by verifying that the system just woke-up but no cycles were detected by the synthetic hysteresis algorithm, which requires signal changes higher than a predetermined noise level. In this case a new threshold is programmed into the sensor unit at a value equal to the previous value plus an offset larger than the measured peak-to-peak noise level. This new threshold value will remain in use until this "wake up on noise" situation is detected by the system again, when the original threshold is restored.

Figure 24:
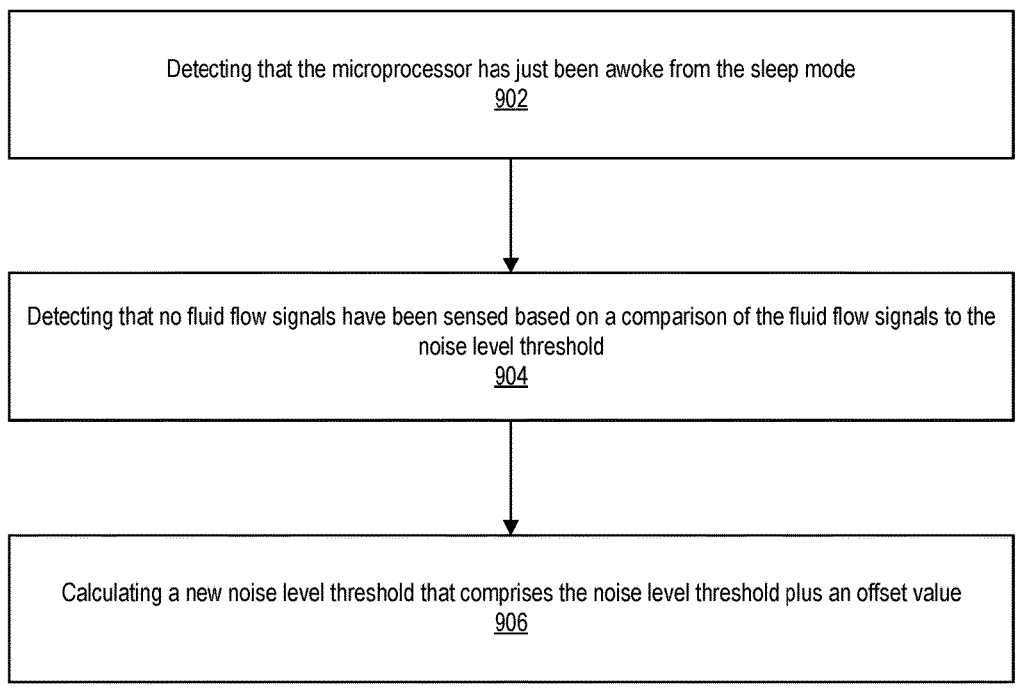
FIG. 24 is a flow chart of another example method of the present disclosure.

This method is illustrated in FIG. 24, which comprises a flow chart. The method includes a step 902 of detecting that the microprocessor has just been awoken from sleep mode, as well as a step 904 of detecting that no fluid flow signals have been sensed based on a comparison of the fluid flow signals to the noise level threshold. In some embodiments, the method includes a step 906 of calculating a new noise level threshold that comprises the noise level threshold plus an offset value.

In some embodiments, the systems of the present disclosure are configured to perform a physical realization test algorithm. The system can determine whether it is properly installed on a physical water metering system using this algorithm. This algorithm comprises a sequence of algorithms based on the descriptions above. It results in a positive indication (e.g., proper installation) only if: (1) a range of maximum minus minimum values calculated with the dynamic auto-ranging algorithms are above a pre-determined value. A minimum number of cycles are detected using the semi-analytical cycle detection algorithm and synthetic hysteresis algorithm.

Synthetic Hysteresis Implementation

Once the system wakes up, samples of fluid flow signals/measurements are analyzed and compared to pre-determined (e.g., lab-based measurements) noise levels by using a synthetic hysteresis algorithm. This algorithm checks for threshold crossing at the pre-determined threshold levels but adds half the peak-to-peak level of the measured known noise level (noise PP2) to the pre-determined detection level. This creates a synthetic hysteresis and virtually eliminates all false signal detection.

A portion of an example code for the synthetic hysteresis algorithm is provided below:

```
if (filteredMeasurement < threshold) {
    goneDown = true
}
if (goneDown && (filteredMeasurement > noisePP2) ) {
    pulseCounter++;
    goneDown = false;
}
```

For context, a drawback of programming a system to detect events on a single pre-determined threshold level measurement is that if the water meter stops measuring water flow in such a position that the sensor signal is close to the pre-determined threshold, the signal noise will cause the system to trigger multiple times In some embodiments, at the sensor unit initialization stage, the detected cycles show self-consistency by passing a test where the period of the detection (timing between detections) is regular, therefore being an indication of regular water flow and not of spurious magnetic noise.

In some embodiments the system will perform actual water flow measurements if the system passes the physical realization test. Otherwise the procedure is reinitiated going back to the dynamic magnetic signal conditioning measurements described above.

Adaptive RF Power algorithm

The sensor unit may be placed in locations very obstructed from the display unit (and RF receiver) from a radio transmission point of view. Many times it is one or two feet below street level on a concrete box with a concrete or metal cover. Between the RF transceiver in the sensor unit and the RF transceiver in the display unit (which could be located on the other side of the property), the signal has to traverse obstructions of the water meter itself concrete, metal, brick and other construction materials, vehicles as well as household appliances and utensils and other materials commonly found in a typical residence.

Thus, the sensor unit can comprise a long range "LoRa" radio with spread-spectrum technology combined with a low data rate and an adaptive RF power level algorithm.

The adaptive RF power level algorithm comprises the Sensor Unit starting operations using a default transmission power level and waits for a response from the display unit.

The display unit measures the received signal level using a built in Radio Signal Strength Indicator (RSSI) and sends this information back to the sensor unit. If the RSSI is below a certain level (or no information is received back at the sensor unit), then the sensor unit increases the transmission power level used by its communications interface. If the RSSI is above a predetermined level, then the display unit instructs the sensor unit to reduce the transmission power level used by its communications interface.

Calibration (Manual and Automated)

The following paragraphs describe the use of calibration with respect to the systems of the present disclosure. To be sure, whether using a sensing element that mounts to an existing water meter or a sensing element that mounts directly to a water pipe, the system can be calibrated to provide an output in physical units of volume and flow rate, for example gallons and gallons per minute.

Figure 25:
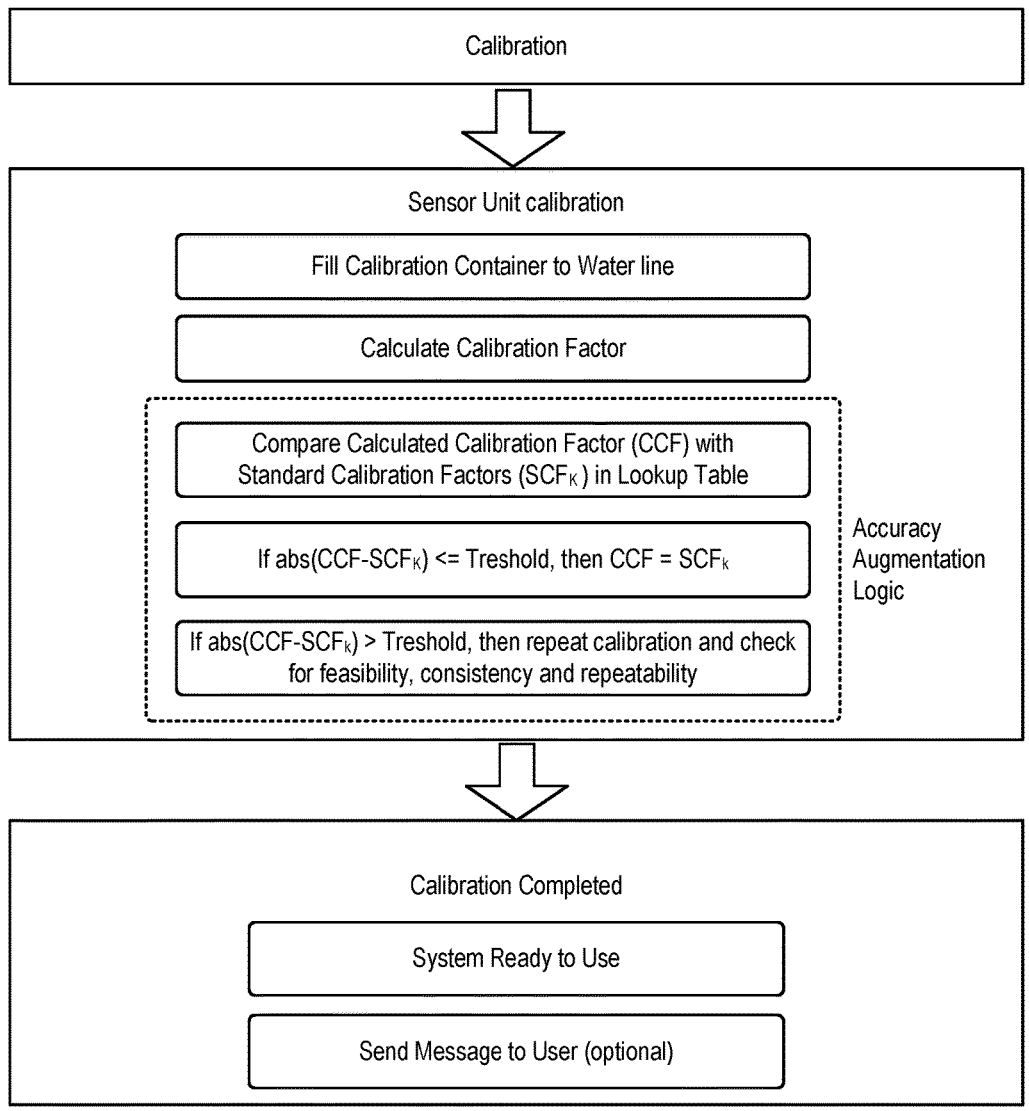
FIG. 25 is a flow chart of a manual calibration method for use with systems of the present disclosure.
Figure 26:
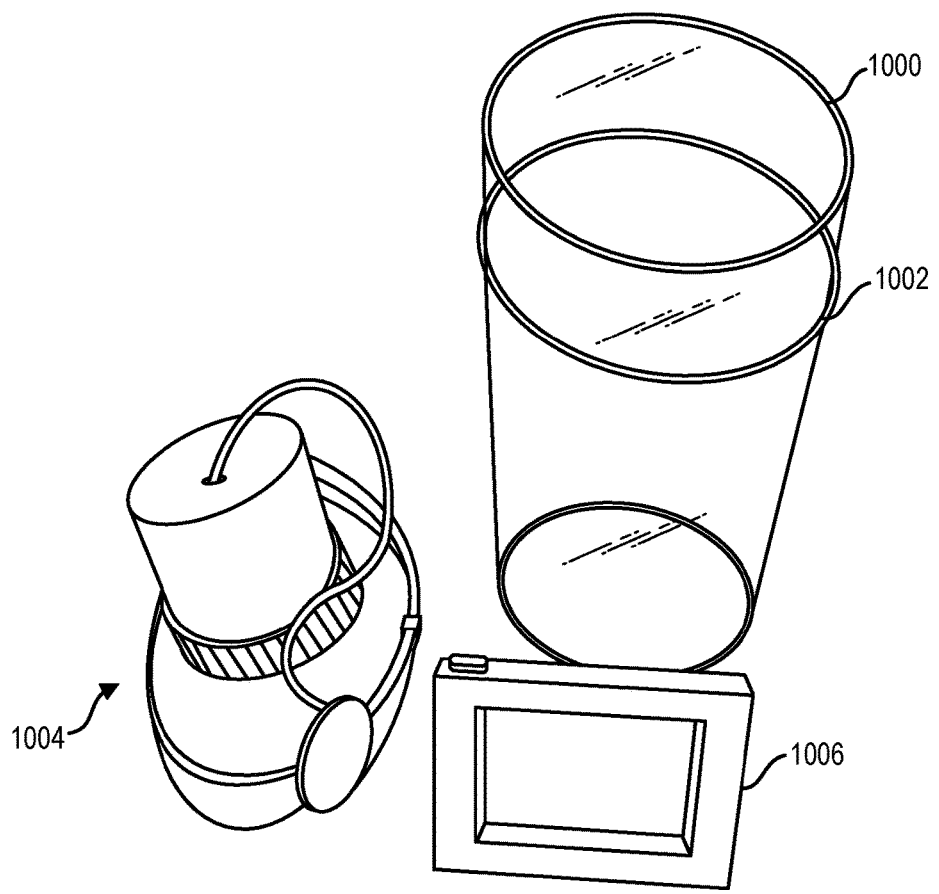
FIGS. 26 and 27 collectively illustrate the use of a calibration container.
Figure 27:
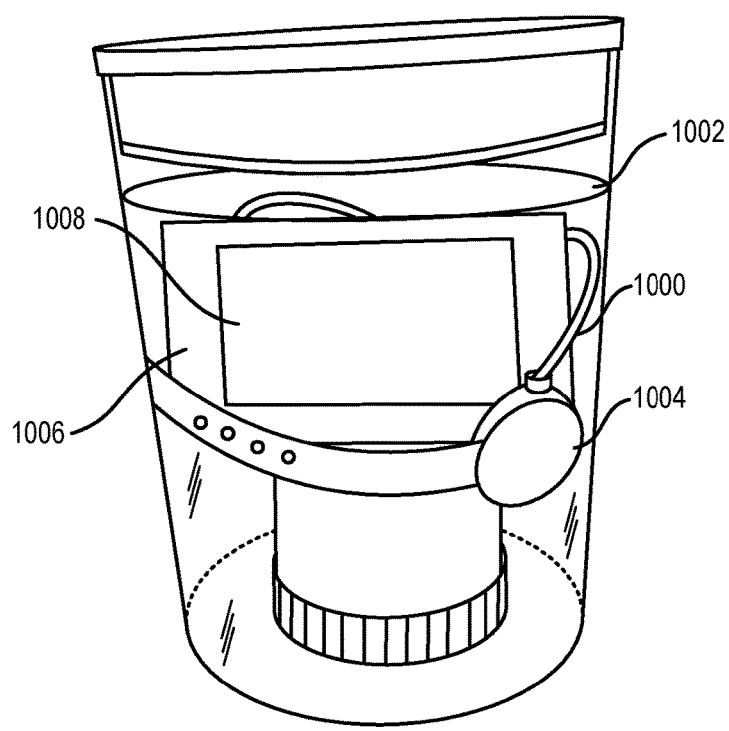

FIGS. 25-27 collectively illustrate an example container calibration method and apparatus. In one approach to calibration, a calibration container 1000 in FIGS. 26 and 27 is utilized. A user will fill the calibration container 1000 to a specified water line 1002. The calibration container 1000 is also used to pack the sensor unit 1004, display unit 1006, and power charger 1008 and has a water line 1002 at a specified known volume, e.g. one gallon mark. In this case as part of the system initialization the user fills the calibration container 1000 to the water mark 1002 and the system computes a calibration factor that converts sensor measurements into physical units of water volume and flow rate. This is the calculated calibration factor (CCF).

Known calibration factors (KCF) for existing water meters or for standard water pipes in the case where a water meter is not present and a direct measurement at the water pipe is required (such as when using an ultrasound sensor unit) are used to improve calibration accuracy. The system uses a lookup table with Known calibration factors (KCF) accurately determined in laboratory tests and compares the calculated calibration factor (CCF) with those on the lookup table. If the Calculated calibration factor (CCF) is within a predetermined threshold (in one example two percent), to a value in the lookup table the value in the look up table is used as the calibration factor. This approach takes advantage of known calibration factors for existing water meters and known calibration factors for standard water pipe diameters that can be accurately measured in the laboratory and used to construct the lookup table.

On the other hand, if the calculated calibration factor (CCF) is not in the lookup table, the calibration is repeated and checked for feasibility, consistency, and repeatability. Checks for feasibility and consistency are comparisons to ensure the calculated calibration factor (CCF) is within ranges known to be feasible and acceptable. Check for repeatability is a comparison to ensure the calculated calibration factors (CCFs) computed in the two calibrations are in agreement within an acceptable error, such as two percent. This process is illustrated in FIG. 25 and this algorithm, which increases accuracy, is referred to as accuracy augmentation logic.

Figure 28:
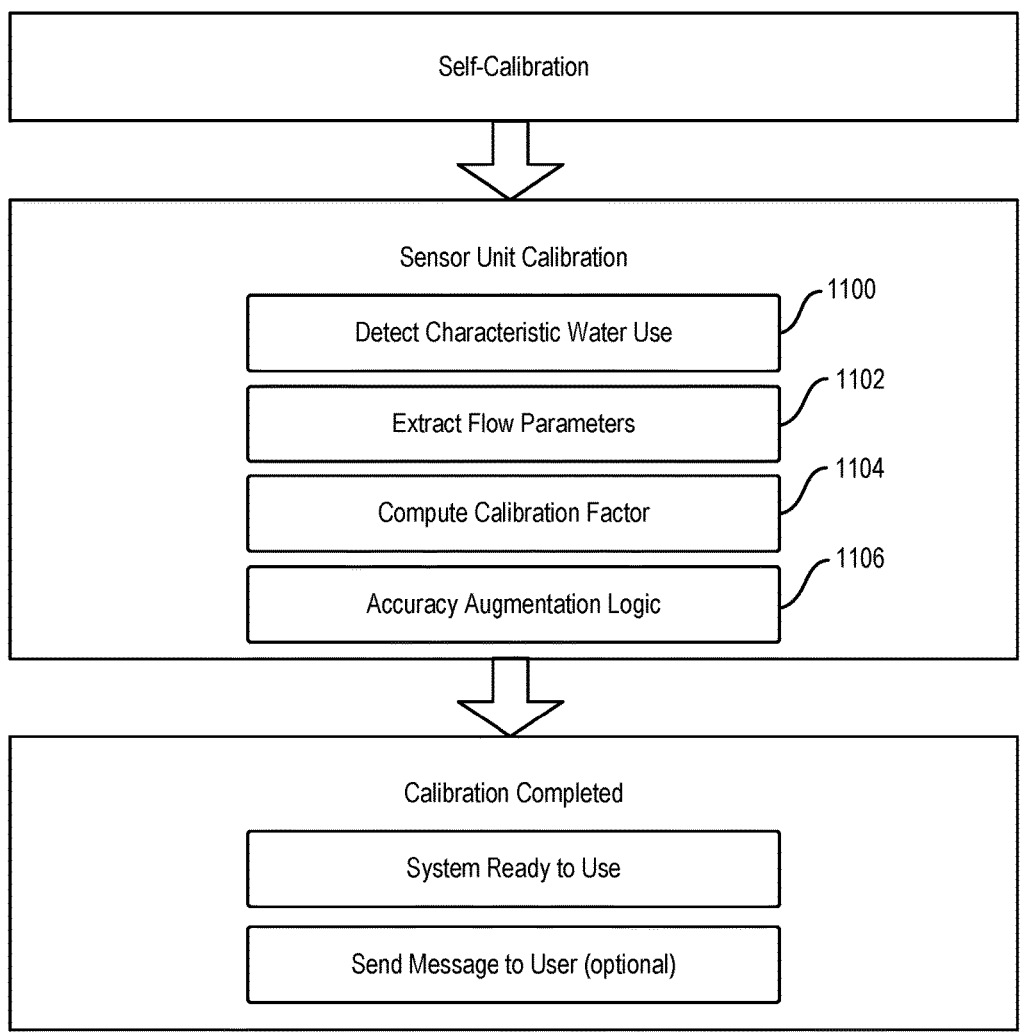
FIG. 28 is a flow chart of an automated calibration method for use with systems of the present disclosure.

Rather than using a manual calibration through a calibration container, FIG. 28 illustrates an automatic calibration method for an example system of the present disclosure. In this case, no specific action is required from the user to complete the calibration.

The method includes a step 1100 of the system detecting a characteristic water use also called an event, for example toilet flushing, for which parameters like the total flow and average flow rate fall into known values. The system computes these parameters for the detected event(s) and uses them to compute a calculated calibration factor (CCF). The calculated calibration factor is processed by the accuracy augmentation logic algorithms described above. Since this process is fully automated, it can be kept running in the background on the system providing further consistency and repeatability checks upon detection of additional characteristic events.

The method comprises a step 1102 of extracting fluid flow parameters based on the at least one characteristic, as well as a step 1104 of computing a calculated calibration factor (CCF) for the fluid flow event. Next, the method comprises a step 1106 of performing accuracy augmentation logic by performing a lookup of the calculated calibration factor (CCF) against a lookup table containing known calibration factors (KCFs). When the calibration factor is not in the calibration factor table, repeat the calibration computation accept the calibration factor that is repeated, repeat until the calibration factor self-consistent (e.g., within a specified threshold to a prior calculated calibration factor value).

Event Recognition Algorithms (ERA)

The systems of the present disclosure are capable of identifying different types of water usage based on measured water flow signals, such as shower, faucet, toilet, irrigation, or other similar events. They are also capable of detecting leaks. This capability provides valuable information on where water is being consumed, allowing increased effectiveness of water use, and reduced water expenses.

There are several challenges in developing effective and efficient event recognition algorithms. Effectiveness refers to an ability to detect and identify events accurately, while efficiency refers to the computational power required to execute the algorithms in real-time and includes both processing power and data storage requirements. Some of the challenges include the variability in characteristics of a given water flow event, for example a toilet flush downstairs is likely to have a different flow response (time history or signature) than a toilet flush upstairs in a given building. Variability is also expected between different buildings and/or houses.

Figure 29:
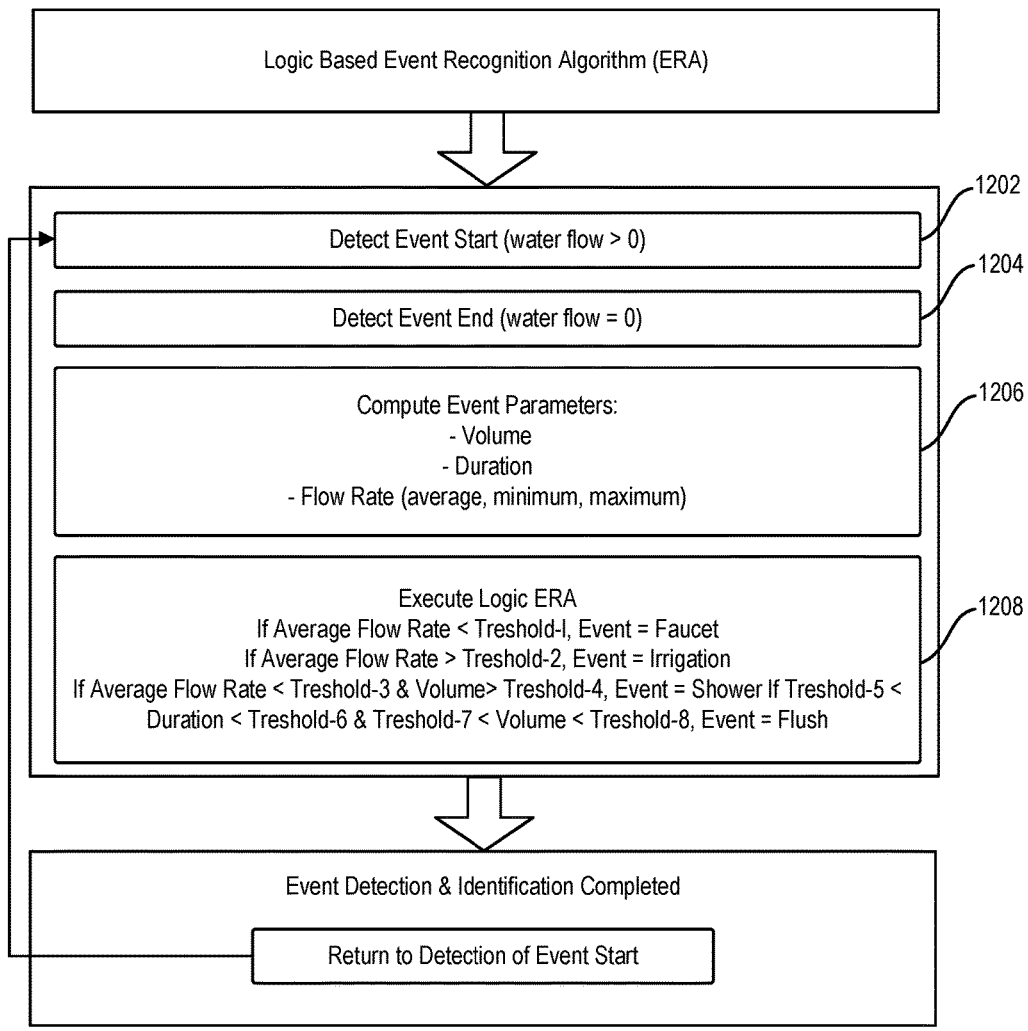
FIG. 29 is a flow chart of a logic based event recognition algorithm of the present disclosure.

An example ERA implemented in an example system of the present disclosure uses a combination of logic and signal correlation to detect and identify different types of water usage. Logic based ERA (as illustrated in FIG. 29) is initiated by detecting the start and end of a water flow event marked respectively by the start of water flow (flow rate larger than zero) in step 1202 and the stoppage of water flow (return of the flow rate to zero) in step 1204. The Sensor Unit measurements are processed to calculate event parameters: Total water volume, event duration and flow rate (average, minimum and maximum) as in step 1206. These parameters are then processed through the logic ERA to determine the event, i.e. type of water usage, as illustrated in step 1208.

Thus, if water flow signals meet or exceed various thresholds, the water flow signals that are representative of water flow events are classified as being a specific type of water flow event. For example, if the water flow signals are determined to have an average flow rate that is less than a first threshold, the water flow event is classified as a faucet opening.

The logic portion of the ERA is based on fundamental characteristics of different types of water usage. For example, the average American shower consumes 17.2 gallons, lasts 8.2 minutes at an average flow rate of 2.1 gallons per minute; flow rates vary from 5 gallons per minute for conventional shower heads down to 1.5 gallons per minute for low-flow shower heads. The average bath uses 35 to 50 gallons of water. Faucets have a flow rate vary from 1.5 to 3 gallons per minute. Toilets manufactured prior to 1980 use 3.5 gallons per flush, older toilets use even more (between 5 and 7 gallons per flush). Toilets built after 1994 use 1.6 gallons per flush and some as little as 1.3 gallons per flush. This information and measurements made in various residences were used to develop a logic based ERA.

Figure 30:
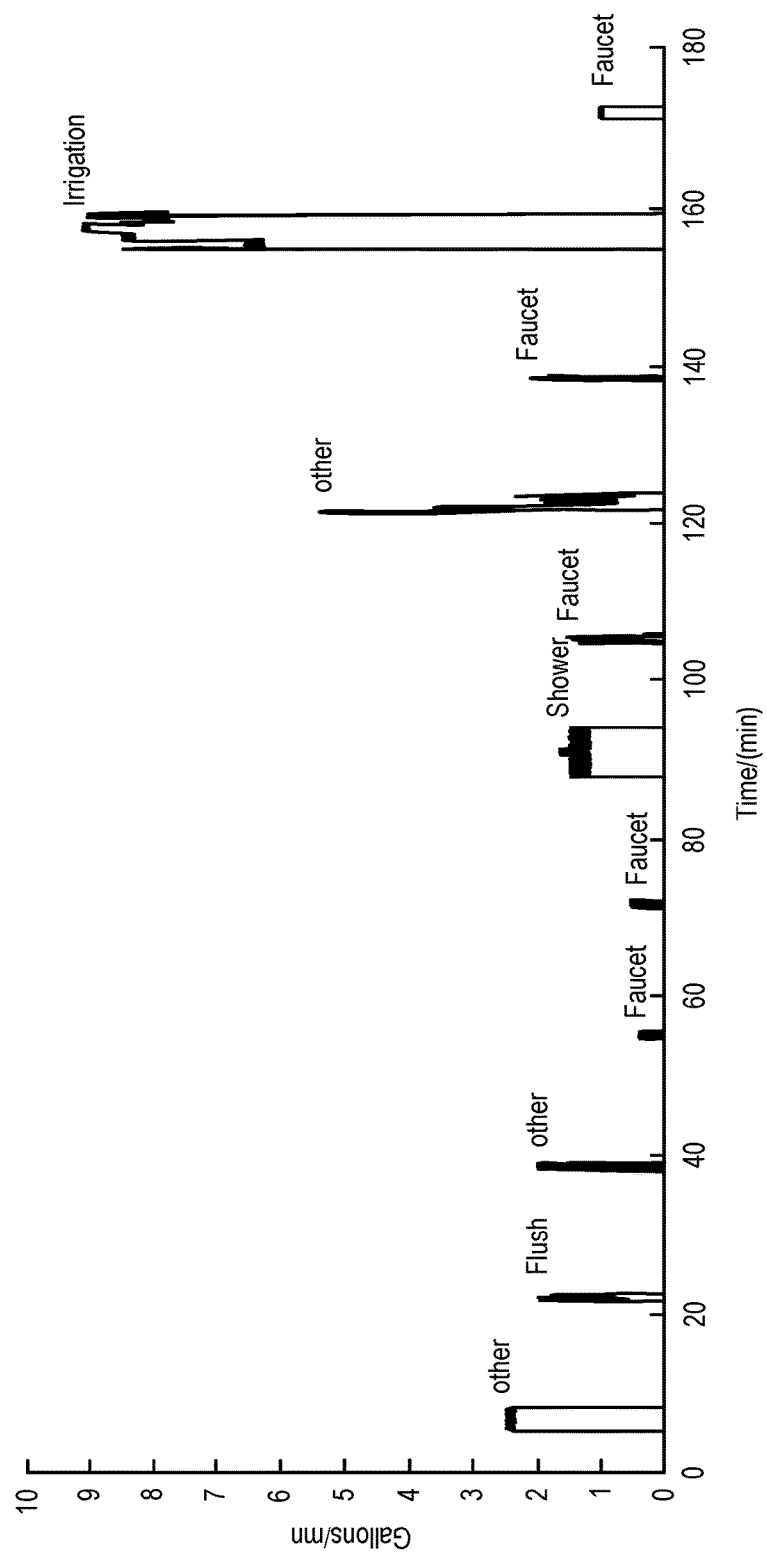
FIG. 30 is a graph of water flow events recognized using one or more event recognition algorithms of the present disclosure.

An example graphical representation of water flow events and their classifications are illustrated in FIG. 30.

Rather than using logic based ERA determinations, the systems of the present disclosure can also (or alternatively) use correlation based ERA analyses as illustrated in FIG. 31.

A correlation based ERA process uses flow rate time history as a more extensive characterization of typical water flow events. These time histories represent signatures of typical water flow events and signal correlations performed between the signatures for typical events and the real time flow rate measurements for ongoing events. In general, this method is valuable when dealing with two or more simultaneous events.

As with other methods, a water flow event start and end are determined in steps 1302 and 1304, respectively. In this case, the typical water flow event with largest correlation is identified in step 1306, selected in step 1308, and subtracted from a measured event and the residual signal is processed through correlation logic in step 1310, allowing the identification of a second simultaneous event. Step 1312 comprises repeating this process until there is no event detected that allows detection of multiple simultaneous events (e.g., no residual signal detected).

Although more computationally intensive than the logic based ERA, the correlation based ERA computational demands are still modest both in terms of computational throughput and data storage. The correlation based ERA has the advantage of being more robust in handling cases with multiple simultaneous events. The accuracy of the correlation based ERA increases significantly if the user is allowed to train the system by initially selecting the actual event from a menu in the User Interface. In this case, typical event time histories are replaced with actual measured time histories, which will results in significant increase in event identification accuracy.

A combination of logic and correlation based ERA provides increased information and independent check improving event identification accuracy with minimum demands on computational resources.

In other advantages, systems of the present disclosure contemplate integration into home (or office) automation systems. To be sure, there exist a number of products for home, commercial, and industrial automation from smart thermostats to sophisticated security systems. Although the systems of the present disclosure are a self-contained, low-cost, turn-key solution to measuring and reporting data on fluid flow and usage, it is possible that the fluid usage data from the sensor unit can be relayed directly to existing home, commercial and industrial automation systems adding critical information on water usage to those systems and increasing their utility and value.

In an additional embodiment, the systems of the present disclosure can be calibrated or trained using end-user feedback. For example, the end user can utilize a display unit to input information during a water flow event. By way of example, when the end user starts a shower, the end user selects or otherwise inputs this event type into the display unit. When the shower is over the end user identifies the end point using the display unit. The system learns by correlating this end user input with the water flow signals sensed during the duration between the start and end of the event. Other events can be categorized by the end user to train or inform the system, which is advantageous to identify specific events and flow rates associated therewith that are specifically indicative of the water supply system of the end user.

In another embodiment, the system detects the event and presents a menu of options for the user to choose from, e.g. shower, flush, irrigation, etc. Once the user selects the appropriate event, the system uses that information to update the parameters used in Logic-based ERA and/or to update the typical event time histories used in the Correlation-based ERA. This user training of the system allows for significantly improved accuracy in event recognition.

Figure 32:
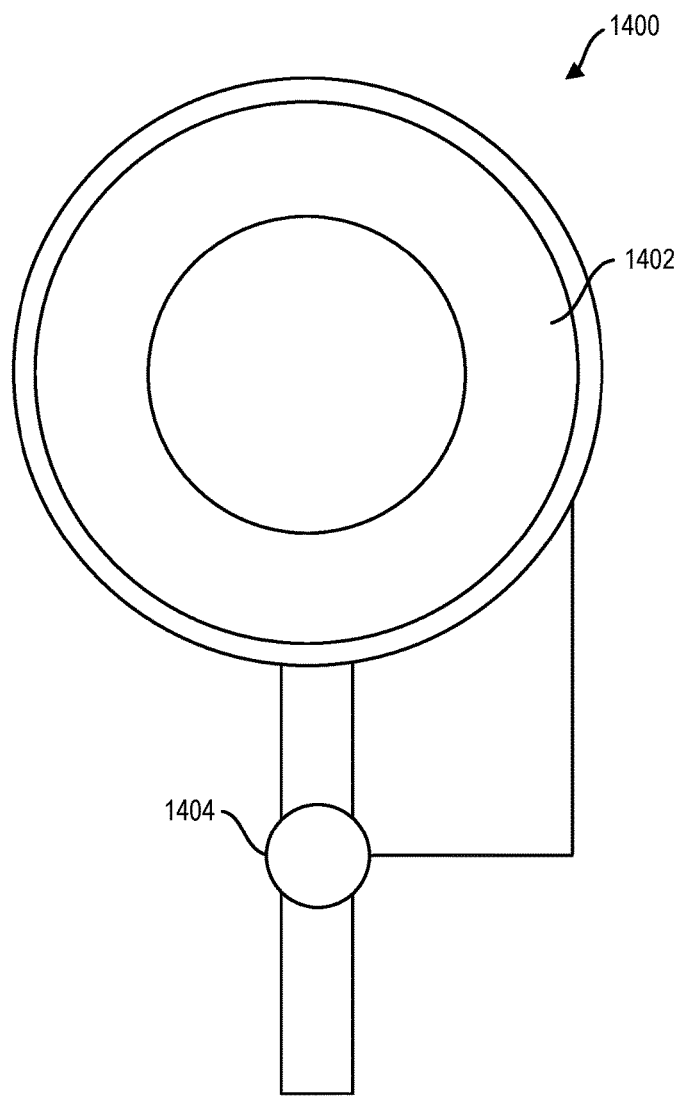
FIG. 32 is a schematic view of an example system of the present disclosure that is used to selectively open and close a valve.

In another embodiment, the systems of the present disclosure can be configured to control water flow through actuating a valve through electrical control. For example, in FIG. 32, a system 1400 (such as the system 100 of FIGS. 2 and 3 by example) is coupled with a water meter 1402. The system 1400 is coupled (either wired or wirelessly) with a valve 1404 that can be selectively controlled to open/close in response to signals from the system 1400.

Figure 34:
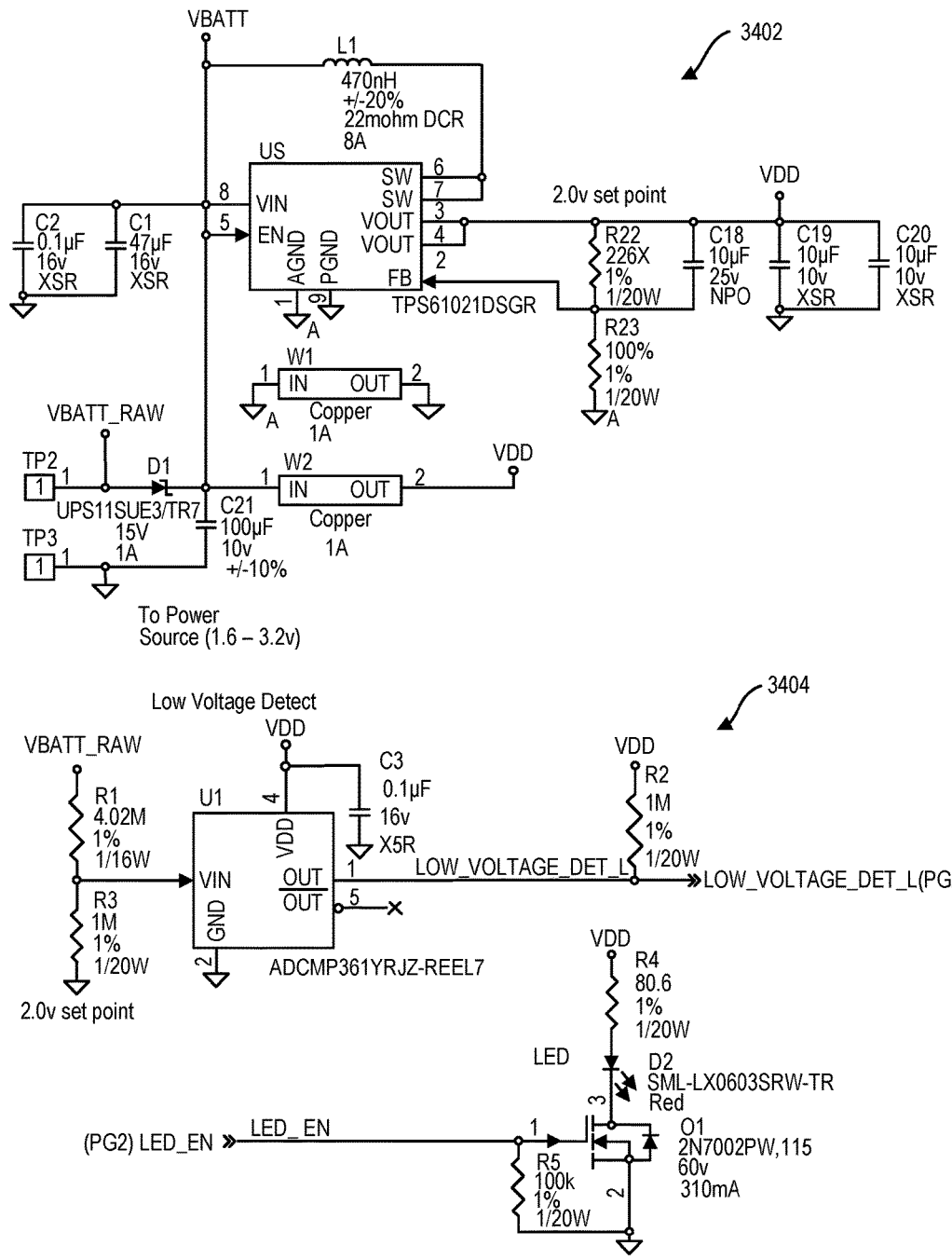
FIGS. 34-37 collectively illustrate various circuit diagrams of example embodiments of components of devices of the present disclosure.
Figure 35:
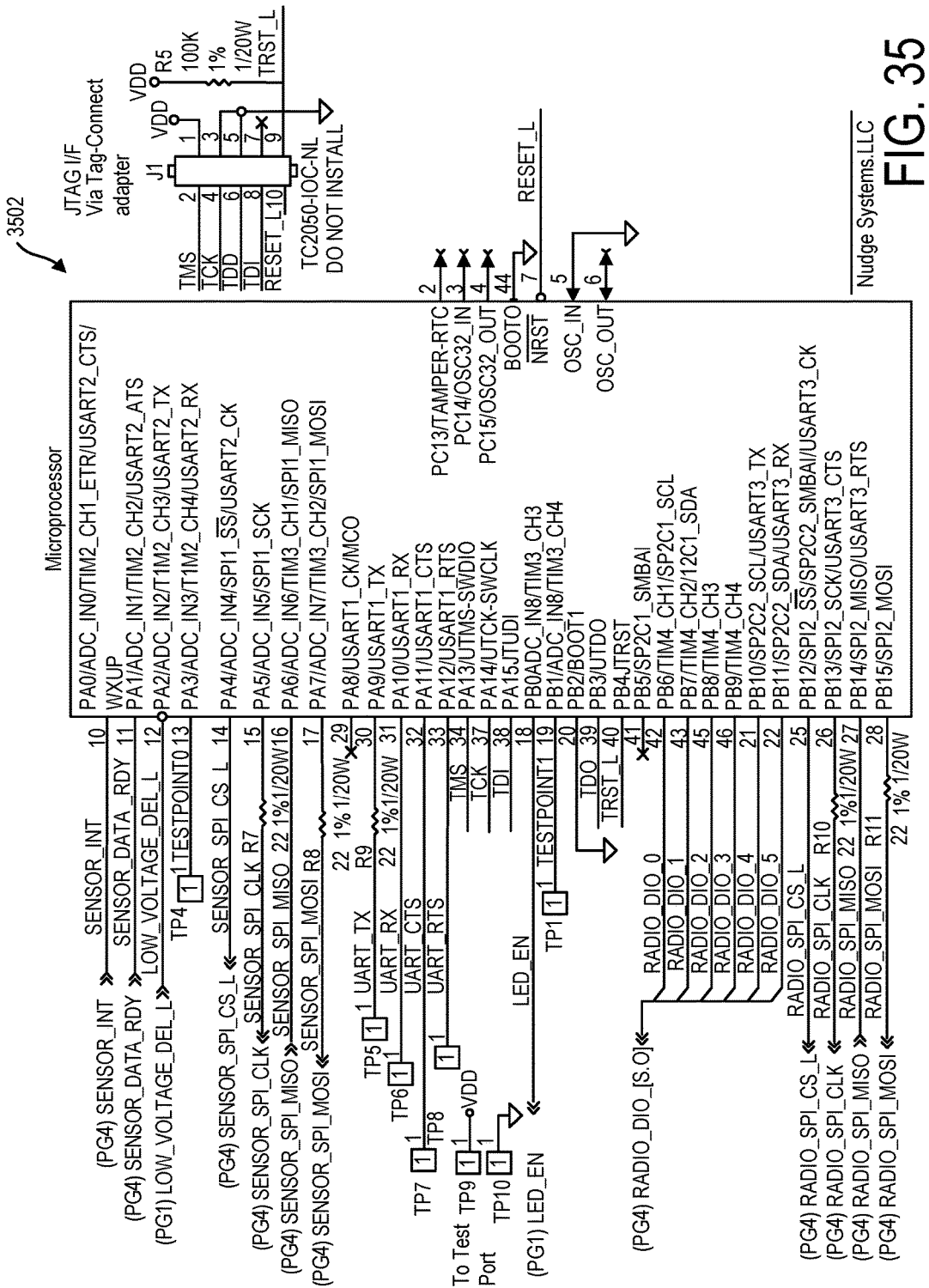
Figure 36:
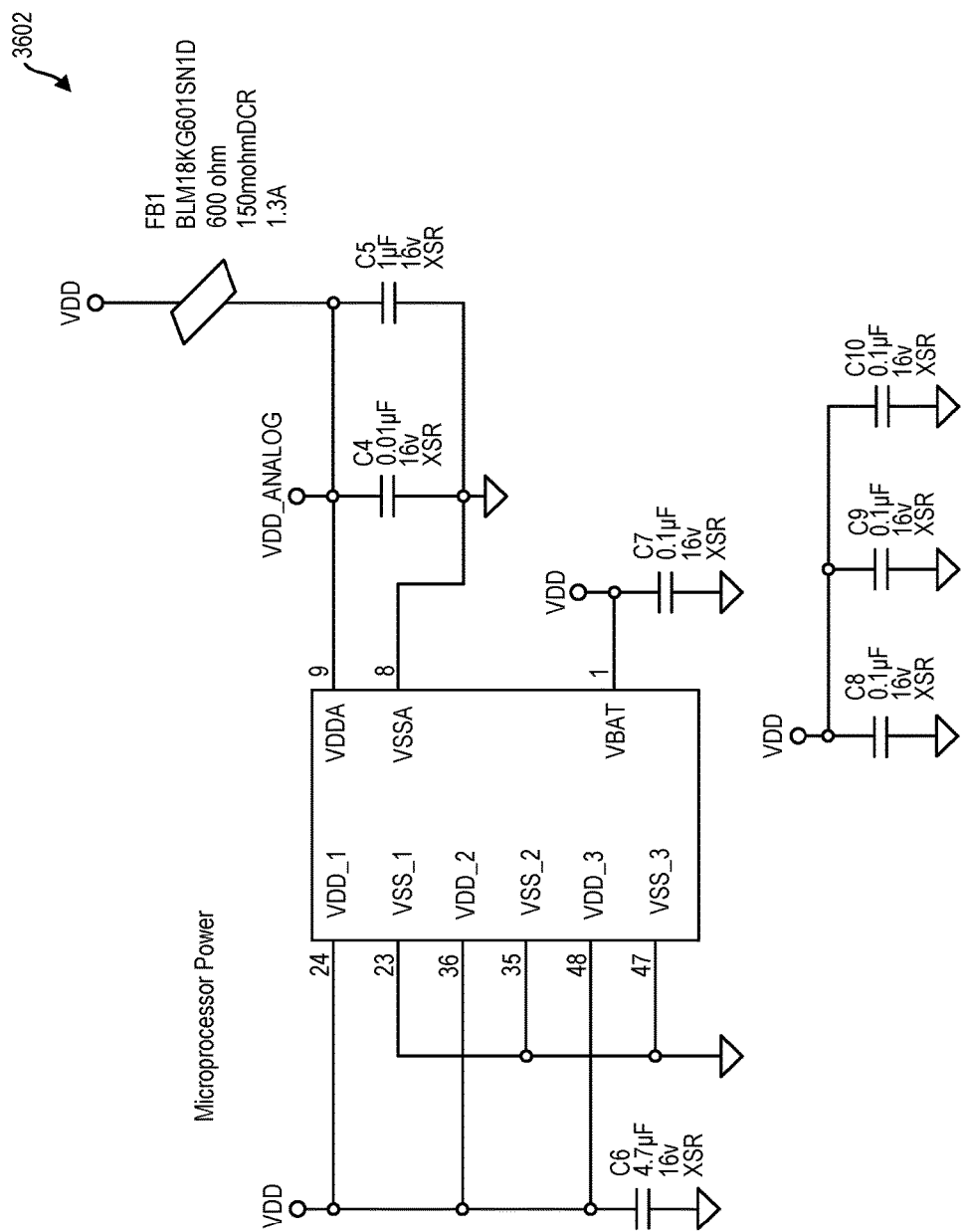
Figure 37:
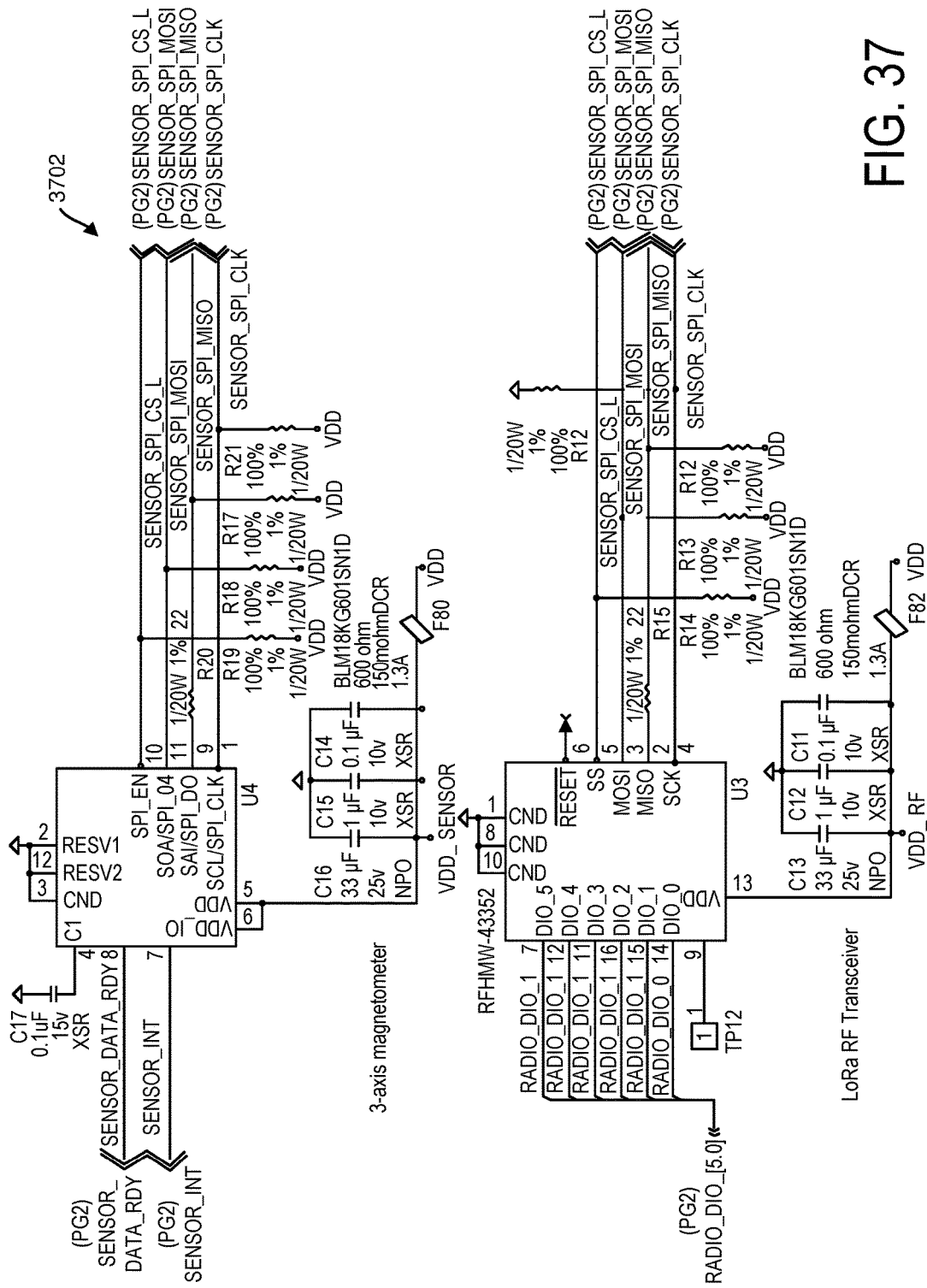

FIG. 34 illustrates an example circuit diagram 3402 of a sensor unit low voltage detection circuit and led circuit diagram 3404. FIG. 35 illustrates a sensor unit microprocessor circuit diagram 3502. FIG. 36 illustrates a sensor unit microprocessor power circuit diagram 3602. FIG. 37 illustrates a sensor unit magnetometer circuit diagram 3702 and radio circuit diagram 3704.

Figure 33:
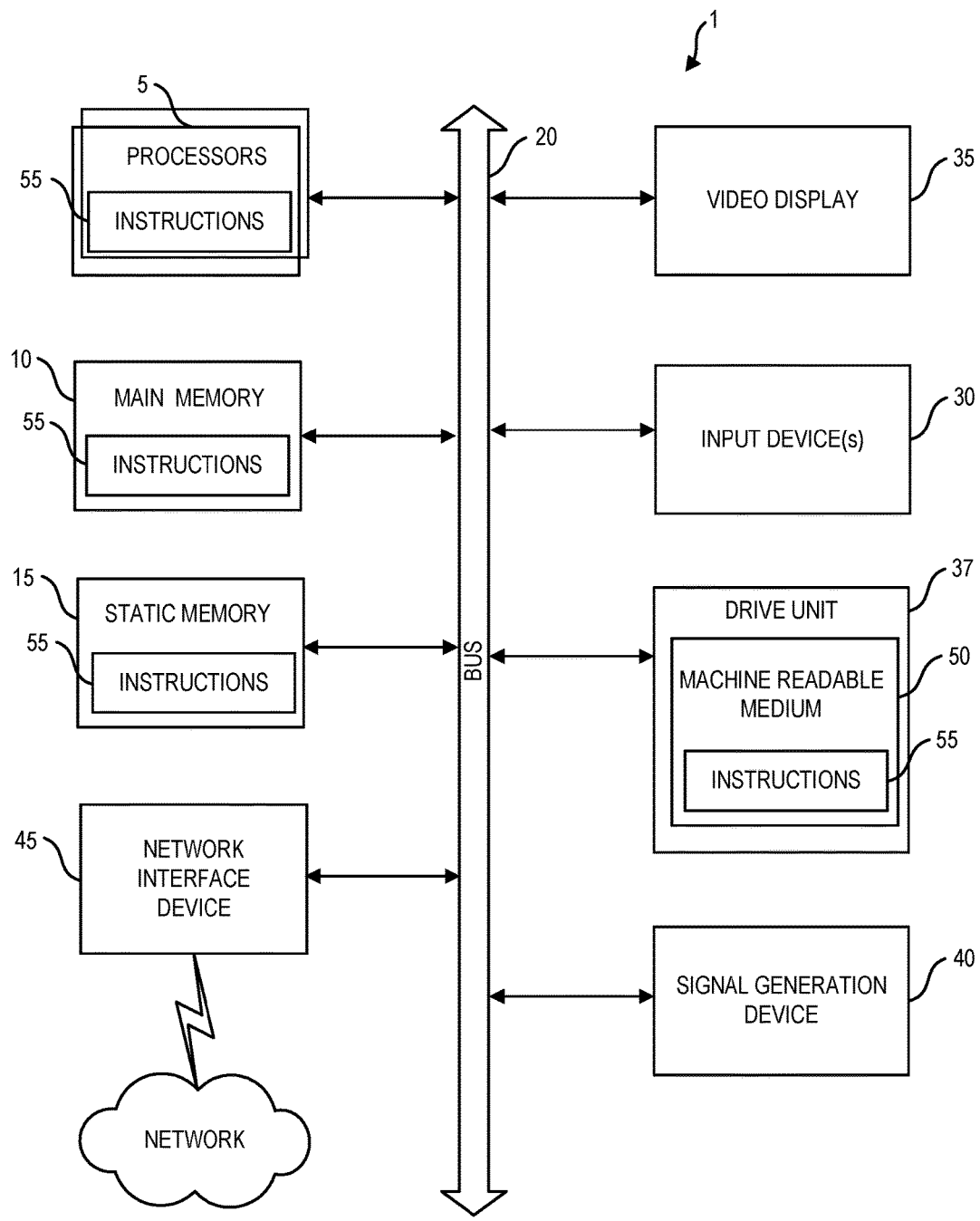
FIG. 33 is a schematic diagram of an example computing device that can be used to implement aspects of the present disclosure.

FIG. 33 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a robotic construction marking device, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processors 5 during execution thereof by the computer system 1. The main memory 10 and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Bolt") may be interchangeably used with its non-capitalized version (e.g., "bolt"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "mechanically connected," etc., are used interchangeably herein to generally refer to the condition of being mechanically/physically connected. If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three dimensional (3D) printing, laser cutting, computer numerical control (CNC) routing, milling, pressing, stamping, extrusion, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

Additionally, components described as being "first" or "second" can be interchanged with one another in their respective numbering unless clearly contradicted by the teachings herein.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A system, comprising:
   a fluid sensor that mounts to a fluid meter enclosed in a sensor enclosure, the fluid sensor measuring analog or digital fluid flow measurements of the fluid meter, the fluid sensor being a three-axis ultra-sensitive magnetometer measuring a magnetic field vector in three axes providing magnitude and direction of the magnetic field vector, the three-axis ultra-sensitive magnetometer using an algorithm to process measurements from the measuring of the magnetic field vector in three axes and compensating for changes in magnitude, phase, and offset ensuring that magnetic cycles caused by mechanical rotation of a water meter magnet are identified in real-time irrespective of location of the three-axis ultra-sensitive magnetometer;
   a communications interface that transmits and receives data;
   a microprocessor that is communicatively coupled with the fluid sensor and the communications interface;
   a component enclosure that comprises a power source that powers both the fluid sensor and the communications interface, wherein the microprocessor infers a flow rate based on the analog or digital fluid flow measurements and generates fluid flow signals, the fluid flow signals being transmitted to a receiving system using the communications interface; wherein the microprocessor is further configured to execute instructions to:
   place the microprocessor into a sleep mode when the fluid sensor senses that the fluid flow signals are below a flow detection threshold;
   program a new flow detection threshold including an offset that is larger than a measured peak-to-peak noise level when a no flow condition is detected; and
   awaken the microprocessor when the fluid sensor senses that the fluid flow signals meet or exceed a flow detection threshold, the fluid sensor sensing a full or partial revolution of a rotator indicative of fluid flow to awaken the microprocessor.

2. The system according to claim 1, wherein the fluid sensor is disposed on a belt that wraps around a housing of the fluid meter.

3. The system according to claim 1, wherein the component enclosure is hermetically sealed and the fluid sensor and power source are coupled through a cable that extends outside the component enclosure.

4. The system according to claim 1, wherein the fluid sensor is provided with adhesive that bonds with the fluid meter.

5. The system according to claim 1, wherein the microprocessor embeds a unique identifying code for the system in the fluid flow signals.

6. The system according to claim 1, wherein the microprocessor is configured to execute instructions to:
   receive the fluid flow signals; and
   filter the fluid flow signals to reduce noise effects and improve a signal-to-noise ratio of the fluid flow signals.

7. The system according to claim 6, wherein the microprocessor is configured to execute instructions to:
   dynamically auto-range the fluid flow signals to enable operation with weak, asymmetrical, and varying frequency of the fluid flow signals by:
   obtaining the fluid flow signals upon initiation of the fluid sensor and sensing of the fluid flow;
   determining maximum and minimum amplitudes of the fluid flow signals;
   selecting an initial detection threshold using the maximum and minimum amplitudes; and
   selecting optimized measurement parameters used to process the fluid flow signals using the initial detection threshold.

8. The system according to claim 7, wherein the microprocessor is further configured to execute instructions to compare the fluid flow signals to a noise level threshold to prevent false detection of fluid flow.

9. The system according to claim 7, wherein the microprocessor is further configured to execute instructions to classify fluid flow events by:
   detecting a beginning of a fluid flow event;
   detecting an end of the fluid flow event;
   computing event parameters between the beginning and the end, the event parameters comprising volume, duration, and flow rate;
   comparing the event parameters to event ranges, each of the event ranges comprising event parameter values and having an event type; and
   assigning the fluid flow event at least one event type based on the comparison.

10. The system according to claim 9, further comprising receiving user input that designates the event type and training the system to improve accuracy of event recognition by adjusting parameters of a logic based event recognition algorithm and updating event time histories.

11. The system according to claim 10, wherein the microprocessor is further configured to execute instructions to further refine the classification of the fluid flow event using historical fluid flow event data and determining correlations therebetween.

12. The system according to claim 10, the user input further comprising a selection of a privacy setting as to a display of specific or aggregate event types.

13. The system according to claim 9, wherein the receiving system comprises a remote display unit that comprises a microprocessor, the remote display unit microprocessor being communicatively coupled with the fluid sensor microprocessor through the communications interface over a wireless link.

14. The system according to claim 13, wherein the fluid sensor and the remote display unit are paired using a unique identifying code to allow operation of multiple systems in close proximity without interference.

15. The system according to claim 1, wherein the microprocessor is further configured to execute instructions to self-calibrate by:
  detect at least one characteristic of a fluid flow event;
  extract fluid flow parameters based on the at least one characteristic;
  compute a calibration factor for the fluid flow event; and
  perform an accuracy augmentation procedure by:
    performing a lookup of the calibration factor against a calibration factor table; and
    when the calibration factor is not in the calibration factor table, repeating the calibration computation until the calibration factors from at least two independent calibrations agree to within a specified error threshold.

16. The system according to claim 1, wherein the microprocessor is further configured to execute instructions to classify fluid flow events by:
  detecting a beginning of one or more fluid flow events;
  detecting an end of the one or more fluid flow events;
  computing correlation of a first fluid flow event of the one or more fluid flow events to historical fluid usage data;
  selecting an event type for the first fluid flow event that is based on a highest computed correlation;
  subtracting values for the event type from measured signals for the first fluid flow event to determine a residual signal;
  utilizing the residual signal to determine one or more event types for a second fluid flow event of the one or more fluid flow events;
  repeating the process if a second residual signal is determined; and
  repeating the process to identify multiple events superimposed in time.

17. The system of claim 1, wherein the sensor is attached to a side surface of the fluid meter.

18. The system according to claim 1, wherein the microprocessor is further configured to execute instructions to calculate fluid flow corresponding to a fraction of the magnetic cycle of the fluid meter.

* * * * *